United States Patent
Kimura et al.

(10) Patent No.: US 7,872,813 B2
(45) Date of Patent: Jan. 18, 2011

(54) OPTICAL ELEMENT, OPTICAL SCANNING DEVICE, AND IMAGE FORMING APPARATUS

(75) Inventors: Tomonori Kimura, Tokyo (JP); Eiichi Hayashi, Kanagawa (JP); Yasuo Yamanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/837,890

(22) Filed: Aug. 13, 2007

(65) Prior Publication Data

US 2008/0049287 A1 Feb. 28, 2008

(30) Foreign Application Priority Data

Aug. 14, 2006 (JP) .............................. 2006-221259

(51) Int. Cl.
*G02B 7/02* (2006.01)

(52) U.S. Cl. ........................... 359/811; 359/819

(58) Field of Classification Search ................ 359/811, 359/819, 827, 642

See application file for complete search history.

(56) References Cited

U.S. PATENT DOCUMENTS 5,912,719 A * 6/1999 Baude et al. ............. 351/160 R
6,465,610 B1 10/2002 Kishi et al.
6,985,312 B2 * 1/2006 Yamakawa et al. .......... 359/819
2005/0280884 A1 12/2005 Atsuumi et al.
2006/0176537 A1 * 8/2006 Andoh ....................... 359/811
2006/0262372 A1 11/2006 Hayashi

FOREIGN PATENT DOCUMENTS

| JP | 11-28745 | 2/1999 |
|---|---|---|
| JP | 2000-141413 | 5/2000 |
| JP | 2003-177214 | 6/2003 |
| JP | 2004-318024 | 11/2004 |
| JP | 2006-126333 | 5/2006 |

\* cited by examiner

*Primary Examiner*—Alicia M Harrington
(74) *Attorney, Agent, or Firm*—Oblon, Spivak, McClelland, Maier & Neustadt, L.L.P.

(57) ABSTRACT

An optical element having an optical surface and at least three convex portions on a surface different from the optical surface, wherein, among the at least three convex portions, two convex portions a space between whose centers is a maximum and one convex portion a length of a perpendicular from whose center to a straight line connecting centers of the two convex portions is a maximum satisfy a relationship of $\tan^{-1}(h/p) \leq$ a first specification value, wherein h is a greater one of heights of the optical element at centers of the two convex portions with reference to a tangential plane of the optical element at a position of a foot of the perpendicular, and p is a length of the perpendicular.

11 Claims, 11 Drawing Sheets

OPTICAL ELEMENT, OPTICAL SCANNING DEVICE, AND IMAGE FORMING APPARATUS

BACKGROUND OF THE INVENTION

1. Field of the Invention

The present invention relates to an optical element, an optical scanning device, and an image forming apparatus.

2. Description of the Related Art

In an optical scanning device for a multi-color image forming apparatus, plural photoconductors are irradiated with plural light beams, respectively, which are emitted from plural laser light sources and pass through a light deflection element for deflecting the traveling directions of the light beams and plural imaging optical elements for imaging the light beams, and each photoconductor is scanned with each light beam in response to the information of each color image so as to form an image corresponding to each color on each photoconductor.

Recently, an image output apparatus such as a digital copying machine and a laser printer which apparatus includes tandem optical systems has been put to practical use in order to comply with the requirements of speeding up and high quality image of a multi-color image forming apparatus. In a tandem optical system in which four photoconductor drums are arranged along the conveyance direction of an output paper sheet, the four photoconductor drums are simultaneously exposed to and scanned with four light beams and four color images developed by using developing machines for respective colors (yellow, magenta, cyan, and black) are superposed sequentially so as to form a color image.

In regard to an imaging optical element of an optical scanning device, JP-A-2003-177214 (particularly, see claim 1 and paragraph 0007) discloses a plastic optical element which is integrally constructed by laminating and jointing plural plastic optical elements, characterized in that a concave portion which is un-transcribed by a mold wall surface for forming a surface containing one or both joint surfaces of the plastic optical element, and at least one step surface (convex surface) are provided on the surface. In the technique disclosed in JP-A-2003-177214, when the plastic optical element is constructed by jointing and integrating optical elements made of a plastic, the precision of arrangement of the jointed optical elements is high and the joint surfaces of the optical elements are improved to be laminated and integrated at low cost.

Also, JP-A-2004-318024 (Particularly, see claim 1 and paragraph 0010) discloses an optical element with a surface having a certain radius of curvature and subjected to transcription, for light-scanning with a beam emitted from a light source and deflected in the main scanning directions, characterized by including a positioning surface for positioning the main scanning directions of the optical element which positioning surface is formed on both edge portions of the optical element in the main scanning directions, and a pair of upper and lower reference surfaces which are orthogonal to the positioning surface. The technique disclosed in JP-A-2004-318024 is to provide an optical element which is capable of attaining the high precision of the positioning thereof with respect to the scanning directions and of easily positioning of plural common optical elements used for the stepwise arrangement thereof, without extremely raising the precision of the optical element.

Herein, in the plastic optical element disclosed in JP-A-2003-177214 and the optical element disclosed in JP-A-2004-318024, steps or reference convex portions are provided on the central portion on a surface different from the optical surface of the (plastic) optical element and both edge portions of the surface different from the optical surface of the (plastic) optical element. It is considered that such positions of the steps and reference convex portions on the surface different from the optical surface of the (plastic) optical element could sufficiently ensure the precision of the arrangement of the (plastic) optical element having no deformation from the ideal form thereof. However, in the case of the (plastic) optical element is a (plastic) optical element having a deformation from the ideal form thereof which may be caused in a process for molding the (plastic) optical element, the precision of the arrangement of the (plastic) optical element may be able to be ensured sufficiently.

For example, the position of the step or reference convex portion provided on the (plastic) optical element may be shifted in the sub-scanning directions of the (plastic) optical element due to the profile deformation of the (plastic) optical element in the sub-scanning directions, and as a result, the optical axis of the (plastic) optical element may be decentered. Accordingly, in regard to the beam spot of a light bean imaged via the (plastic) optical element, a desired bean spot diameter may not be able to be obtained and/or a desired beam spot position may not be able to be obtained (a curve of the scanning line may be caused). Thus, the optical quality of the (plastic) optical element may be degraded.

Also, in an optical scanning device for a multi-color image, the positions of the beam spots of light beams for respective colors may be displaces from one another (the curves of scanning lines of the light beams for respective colors which are different from one another may be caused) due to the profile deformation of the (plastic) optical element, and a significant color shift may be caused on an image formed in an image forming apparatus.

Such profile deformation of the (plastic) optical element tends to be caused when the cycle time period for molding the (plastic) optical element is reduced for the cost down of molding of the (plastic) optical element. That is, it is considered that the profile deformation of the (plastic) optical element may be caused by the non-uniformity of the temperature distribution of a mold for molding the (plastic) optical element or the non-uniformity of a cooling process after releasing the (plastic) optical element from a mold, which non-uniformity may be caused when the cycle time period for molding the (plastic) optical element is reduced. Therefore, differences among the profiles of the (plastic) optical elements may be produced, for example, among the shots of molding of the (plastic) optical elements and/or among the plural cavities for shaping the (plastic) optical elements formed in a mold.

Herein, the inventors have found to provide an optical element capable of improving the precision of arrangement of the optical element. Also, the inventors have found to provide an optical scanning device which includes an optical element capable of improving the precision of arrangement of the optical element. Furthermore, the inventors have found to provide an image forming apparatus which includes an optical scanning device which includes an optical element capable of improving the precision of arrangement of the optical element.

SUMMARY OF THE INVENTION

According to one aspect of the present invention, there is provided an optical element having an optical surface and at least three convex portions on a surface different from the optical surface, wherein, among the at least three convex portions, two convex portions a space between whose centers is a maximum and one convex portion a length of a perpendicular from whose center to a straight line connecting centers of the two convex portions is a maximum satisfy a relationship of $\tan^{-1}(h/p) \leq$ a first specification value, wherein h is a greater one of heights of the optical element at centers of the two convex portions with reference to a tangential plane of the optical element at a position of a foot of the perpendicular, and p is a length of the perpendicular.

According to another aspect of the present invention, there is provided an optical element having an optical surface and at least three convex portions on a surface different from the optical element, wherein, among the at least three convex portions, centers of two convex portions a space between whose centers is a maximum and a center of one convex portion a length of a perpendicular from whose center to a straight line connecting centers of the two convex portions is a maximum are positioned in a first circle which is centered on a center of gravity of a surface having the at least three convex portions and has a radius of L/2 or on the first circle, and L is a length of the optical element in directions of a straight line connecting centers of the two convex portions.

According to another aspect of the present invention, there is provided an optical scanning device for scanning an object by using light generating from a light source which device includes at least one optical element, wherein the at least one optical element includes the optical element as described above.

According to another aspect of the present invention, there is provided an image formation apparatus for forming an image on a photoconductor which apparatus includes an optical scanning device for scanning the photoconductor by using light generating from a light source, wherein the optical scanning device includes the optical scanning device as described above.

DETAILED DESCRIPTION OF THE PREFERRED EMBODIMENTS

Figure 1A:
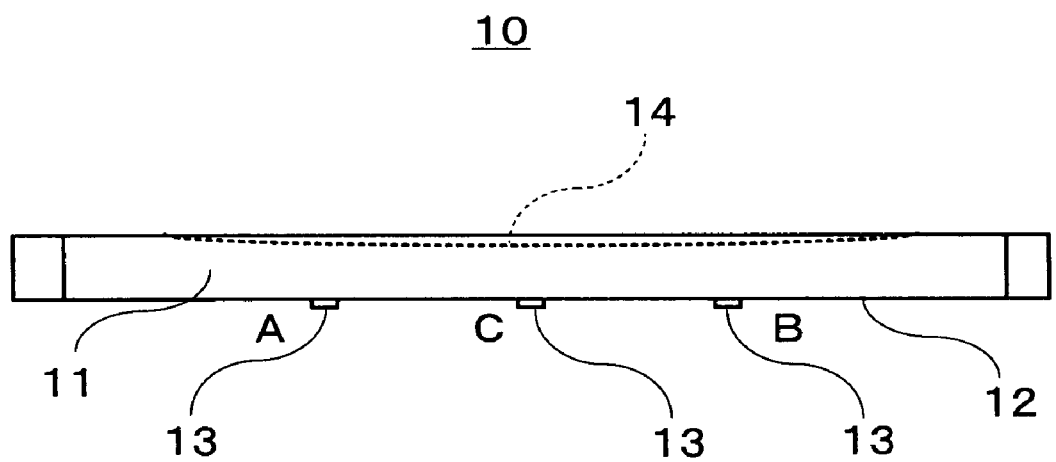
FIGS. 1A and 1B are diagrams illustrating the schematic configuration of an example of the optical element according to the first embodiment of the present invention.

Next, the preferred embodiments of the present invention are described with reference to the accompanying drawings.

The first embodiment of the present invention is an optical element having an optical surface and at least three convex portions on a surface different from the optical surface, in which, among the at least three convex portions, two convex portions a space between whose centers is a maximum and one convex portion a length of a perpendicular from whose center to a straight line connecting centers of the two convex portions is a maximum satisfy a relationship of $$\tan^{-1}(h/p) \leq \text{a first specification value,}$$

wherein h is a greater one of heights of the optical element at centers of the two convex portions with reference to a tangential plane of the optical element at a position of a foot of the perpendicular, and p is a length of the perpendicular.

The optical element according to the first embodiment of the present invention has an optical surface and at least three convex portions on a surface different from the optical surface. The optical element is not particularly limited and may be a lens for refracting light, a plane parallel plate for transmitting light, or a mirror for reflecting light. Also, the optical element has at least one optical surface and at least one surface different from the optical surface(s). The optical surface is a surface having a function of the optical element and may be a surface of a lens for refracting light, a parallel plane which transmits light, or a surface of a mirror for reflecting light. The surface different from the optical surface is a surface having no function of the optical element. The optical element has at least three convex portions on at least one of the surface(s) different from the optical surface. All or a part of the at least three convex portions may be convex portions identical to one another or may be convex portions different from one another. However, it is preferable that all of the at least three convex portions be identical convex portions, in order to improve the precision of arrangement of the optical element. Particularly, it is preferable that the heights of the at least three convex portions can be regarded as being all identical. Herein, the term "identical" includes both being completely identical and being regarded as being substantially identical in view of the precision of arrangement of the optical element. The number or form of the convex portion is not particularly limited. The form of the convex portion may be a projection form.

In the optical element according the first embodiment of the present invention, the at least three convex portions (including convex portions A, B and C) include particular two convex portions (convex portions A and B) and a particular one convex portion (convex portion C). However, not all of the centers of the particular two convex portions (A and B) and center of the particular one convex portion (C) are present on the same straight line. Additionally, the term "center of a convex portion" means a geometrical center of gravity of a surface of a convex portion at the opposite side of a surface different from an optical surface.

Herein, the space between the centers of the particular two convex portions (A and B) is a maximum and equal to or greater than the space between the centers of two convex portions (A and C, B and C, etc.) with respect to a combination of other two convex portions (A and C, B and C, etc.) among the at least three convex portions (including A, B and C). Also, the length of a perpendicular from the center of the particular one convex portion (C) to a straight line connecting the centers of the particular two convex portions (A and B) is a maximum and equal to or greater than the length of a perpendicular from the center of another convex portion (D) except the particular two convex portions (A and B) and the particular one convex portion (C), among the at least three convex portions (including A, B and C, and further including, for example, D), to a straight line connecting the centers of the particular two convex portions (A and B). Additionally, if plural combinations corresponding to the particular two convex portions are present, any two convex portions corresponding to the particular two convex portions may be selected. Also, if plural candidates for the particular one convex portion are present, any convex portion corresponding to the particular one convex portion may be selected.

Then, the particular two convex portions (A and B) and the particular convex portion (C) satisfy a relationship of $$\tan^{-1}(h/p) \leq \text{a first specification value.}$$

In other words, $h/p \leq \tan$ (a first specification value). Herein, h is a greater one of heights of the optical element at the centers of the particular two convex portions (A and B) with reference to a tangential plane of the optical element at the position of a foot of the perpendicular, and p is the length of the perpendicular. Additionally, the tangential plane of the optical element at the position of a foot of the perpendicular is a tangential plane at the position of a foot of the perpendicular and at the side of the particular two convex portions (A and B), and the height of the optical element at the center of the convex portion (A or B) is the distance from the tangential plane of the optical element at the position of a foot of the perpendicular to the center of the surface of the convex portion (A or B) at the side of the tangential plane. Also, if the heights of the optical element at the centers of the particular two convex portions (A and B) with reference to a tangential plane of the optical element at the position of a foot of the perpendicular are identical, h may be any of the heights of the optical element at the centers of the particular two convex portions (A and B) with reference to a tangential plane of the optical element at the position of a foot of the perpendicular.

Also, the first specification value is a specification value relating to the value of $\tan^{-1}(h/p)$. More particularly, the first specification value is a specification value of an angle corresponding to a side with a height of h in a right-angled triangle with a base with a length of p and the height of h. The first specification value is determined depending on the form of the optical element and an optical property or properties required for the optical element, etc. The first specification value may be, for example, the specification value of so-called β-decentering of optical element, and as the specification value of β-decentering of optical element, for example, 100" may be provided.

Then, in the optical element according to the first embodiment of the present invention, the particular two convex portions (A and B) and the particular one convex portion (C) are provided on a surface different from the optical surface such that the value of h/p (the value of an angle corresponding to a side with a height of h in a right-angled triangle with a base with a length of p and the height of h) is equal to or less than tan (the first specification value), whereby it generally becomes possible to reduce an angle of a plane containing the centers of the particular two convex portions (A and B) and the center of the particular one convex portion (C) with respect to the surface of the particular one convex portion (C) at the opposite side of a surface different from the optical surface so that it becomes possible to reduce the deviation of arrangement of the optical element (such as the deviation of an optical axis of the optical element) which is caused by a deviation from the ideal form of the optical element (deformation of the optical element) in the directions of a straight line connecting the centers of the particular two convex portions (A and B).

According to the first embodiment of the present invention, it becomes possible to provide an optical element capable of improving the precision of arrangement of the optical element. Also, according to the first embodiment of the present invention, it may not be necessary to require an extremely high precision with respect to the manufacture of an optical element, since it becomes possible to provide an optical element capable of improving the precision of arrangement of the optical element. Also, it becomes possible to improve the productivity of an optical element, since it becomes possible to reduce the deviation of arrangement of an optical element which is caused by a deviation from the ideal form of the optical element (deformation of the optical element) such as warpage of the profile of the optical element. Also, it becomes possible to reduce the degradation of the optical property of an optical element, since it becomes possible to reduce the deviation of arrangement of the optical element.

In the optical element according to the first embodiment of the present invention, preferably, $$h = (x^2/L^2) \times h_0,$$

wherein x is a space between centers of the two convex portions, L is a length of the optical element in directions of a straight line connecting centers of the two convex portions, and $h_0$ is a greater one of heights of ends of the optical element in directions of a straight line connecting centers of the two convex portions with reference to a tangential plane of the optical element at a position of a foot of the perpendicular.

Herein, the formula, $h = (x^2/L^2) \times h_0$, means that a deviation from the ideal form from the optical element (deformation of the optical element) in the directions of a straight line connecting the centers of the particular two convex portions (A and B) is or can be substantially regarded as a quadratic function of the space between the centers of the two convex portions. Herein, x is the space between the centers of the particular two convex portions (A and B), L is the length of the optical element in the directions of a straight line connecting the centers of the particular two convex portions (A and B), and $h_0$ is a greater one of the heights of the ends of the optical element in the directions of a straight line connecting the centers of the particular two convex portions (A and B) with reference to a tangential plane of the optical element at the position of a foot of the perpendicular.

Additionally, the height of an end of the optical element is a distance from a tangential plane of the optical element at the position of a foot of the perpendicular to the end of the optical element at the side of the tangential plane. Also, if the heights of ends of the optical element in the directions of a straight line connecting the centers of the particular two convex portions (A and B) with reference to a tangential plane of the optical element at the position of a foot of the perpendicular are identical, $h_0$ may be any of the heights of the ends of the optical element in the directions of a straight line connecting the centers of the particular two convex portions (A and B)

with reference to a tangential plane of the optical element at the position of a foot of the perpendicular.

Additionally, if the optical element satisfies $h=(x^2/L^2) \times h_0$, it becomes possible to provide an optical element capable of particularly improving the precision of arrangement of the optical element when the optical element is obtained (manufactured) such that the deviation from the ideal form of the optical element (deformation of the optical element) in the directions of a straight line connecting the centers of the particular two convex portions (A and B) is or can be substantially regarded as a quadratic function of the space between the centers of the two convex portions.

In the optical element according to the first embodiment of the present invention, preferably, the two convex portions and the one convex portion satisfy a relationship of $\tan^{-1} (q/x) \leq$ a second specification value, wherein q is a height of a top surface of one convex portion of the two convex portions with reference to a top surface of the other convex portion and x is a space between centers of the two convex portions.

That is, the particular two convex portions (A and B) and the particular one convex portion (C) satisfy a relationship of $\tan^{-1} (q/x) \leq$ a second specification value.

In other words, $q/x \leq \tan$(a second specification value). Herein, q is the height of the top surface of one convex portion (A or B) of the particular two convex portions (A and B) with reference to the top surface of the other convex portion (B or A) and x is the space between the centers of the particular two convex portions (A and B). Additionally, the height of the top surface of one convex portion (A or B) of the particular two convex portions (A and B) with reference to the top surface of the other convex portion (B or A) is the distance from the top surface of one convex portion (A or B) to the top surface of the other convex portion (B or A) and the top surface of a convex portion means a surface of the convex portion at the opposite side of a surface different from the optical surface.

Also, the second specification value is a specification value relating to the value of $\tan^{-1}$ (q/x). More particularly, the second specification value is a specification value of an angle corresponding to a side with a height of q in a right-angled triangle with a base with a length of x and the height of q. The second specification value is determined depending on the form of the optical element and an optical property or properties required for the optical element, etc. The second specification value may be, for example, the specification value of so-called γ-decentering of optical element, and as the specification value of γ-decentering of optical element, for example, 100" may be provided.

Then, in the optical element according to the first embodiment of the present invention, the particular two convex portions (A and B) and the particular one convex portion (C) are provided on a surface different from the optical surface such that the value of q/x (the value of an angle corresponding to a side with a height of q in a right-angled triangle with a base with a length of x and the height of q) is equal to or less than tan (the second specification value), whereby it generally becomes possible to reduce an angle of a straight line connecting the centers of the particular two convex portions (A and B) with respect to the top surface of one convex portion (A or B) of the particular two convex portions (A and B) so that it becomes possible to reduce the deviation of arrangement of the optical element (such as the deviation of an optical axis of the optical element) which is caused by a deviation from the ideal form of the optical element (deformation of the optical element) in the directions of a straight line connecting the centers of the particular two convex portions (A and B).

Therefore, it becomes possible to provide an optical element capable of further improving the precision of arrangement of the optical element.

In the optical element according to the first embodiment of the present invention, preferably, the at least three convex portions are only composed of the two convex portions and the one convex portion. When the at least three convex portions are only composed of the particular two convex portions (A and B) and the particular one convex portion (C), that is, the at least three convex portions are only composed of the three convex portions (A, B and C), it becomes possible to determine the arrangement of an optical element depending on only the three convex portions (A, B and C). Therefore, it becomes possible to arrange an optical element with a better precision.

In the optical element according to the first embodiment of the present invention, preferably, a foot of the perpendicular is a center of a straight line connecting centers of the two convex portions. When a foot of the perpendicular is a center of a straight line connecting centers of the particular two convex portions (A and B), the centers of the particular two convex portions (A and B) and the center of the particular one convex portion form an isosceles triangle. In other words, the positions of the centers of the particular two convex portions (A and B) are symmetric with respect to the perpendicular. In this case, it becomes possible to arrange more easily the particular two convex portions (A and B) and the particular one conventional portion (C) such that the particular two convex portions (A and B) and the particular one conventional portion (C) satisfy a relationship of $\tan^{-1}$ (h/p)$\leq$a first specification value and/or a relationship of $\tan^{-1}$ (q/x)$\leq$a second specification value. Therefore, it becomes possible to provide an optical element capable of further improving the precision of arrangement of the optical element more easily.

Figure 1B:
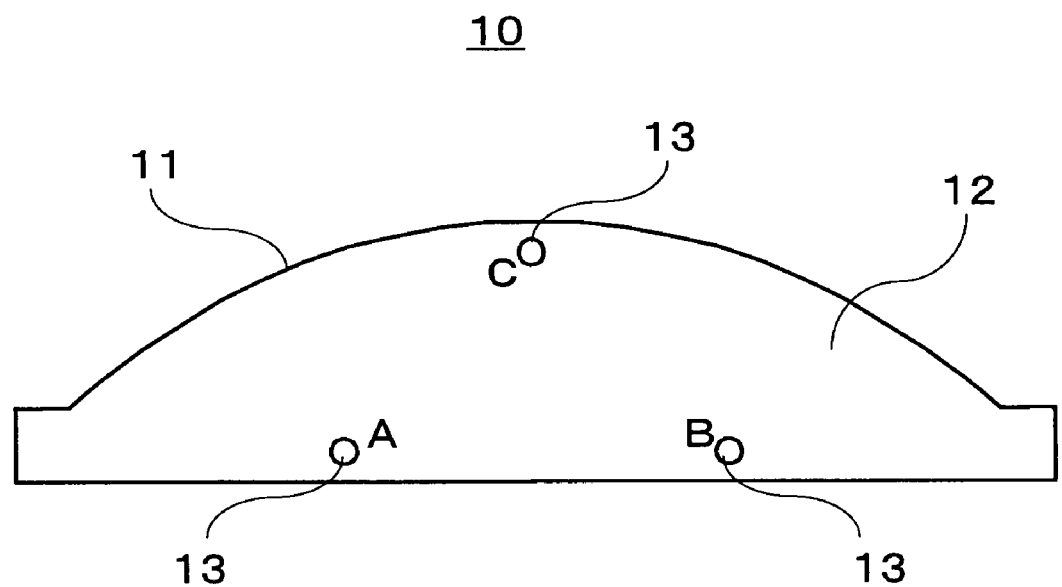

FIGS. 1A and 1B are diagrams illustrating the schematic configuration of an example of the optical element according to the first embodiment of the present invention. FIG. 1A is a front view of the example of the optical element according to the first embodiment of the present invention and FIG. 1B is a bottom view of the example of the optical element according to the first embodiment of the present invention. As shown in FIGS. 1A and 1B, an optical element 10 according to the first embodiment of the present invention has an optical surface 11 and a surface 12 different from the optical surface 11. On the surface 12 different from the optical surface 11, three convex portions 13 are provided at positions A, B and C, respectively. The three convex portions 13 have forms identical to one another. Also, the optical element 10 may have a sinking surface 14 at the opposite side of the surface 12 different from the optical surface 11. Additionally, the sinking surface 14 is a concave surface provided to reduce the generated deformation of the optical surface 11 by generating a deviation (deformation) from the ideal form of the optical element 10 in the sinking surface 14.

Figure 2A:
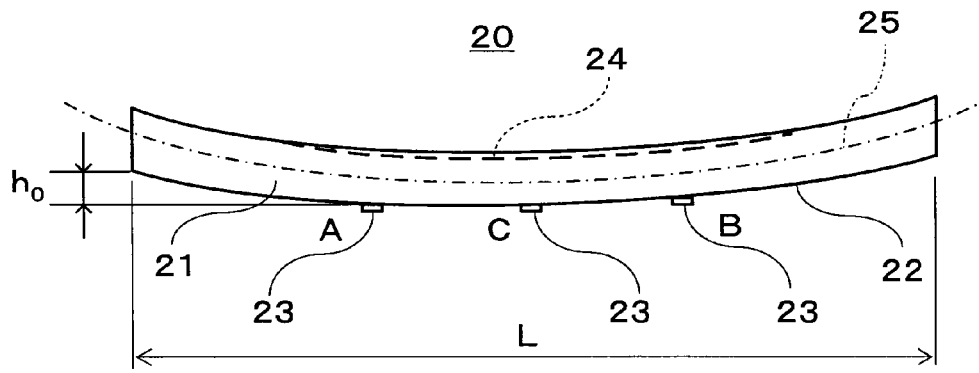
FIGS. 2A-2E are a first set of diagrams illustrating the detailed configuration of an example of the optical element according to the first embodiment of the present invention.
Figure 2B:
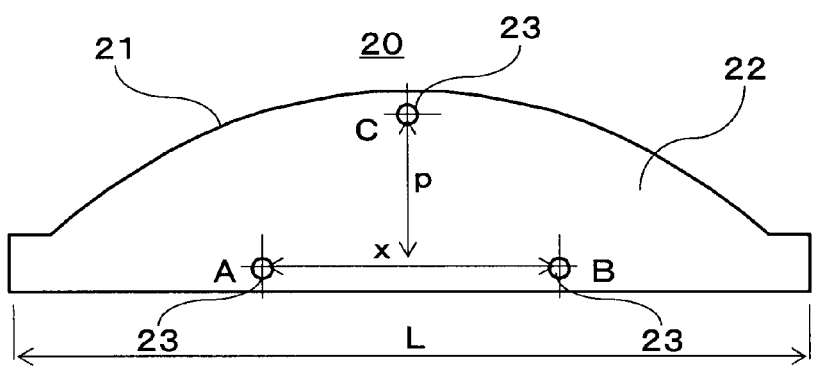
Figure 2D:
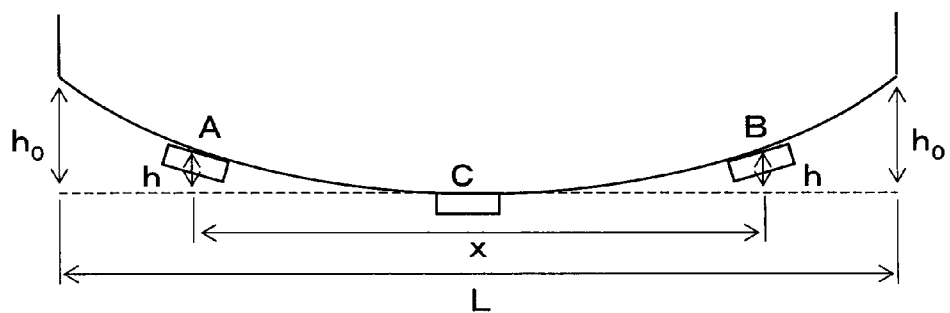
Figure 2C:
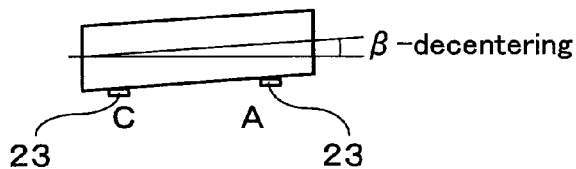
Figure 2E:
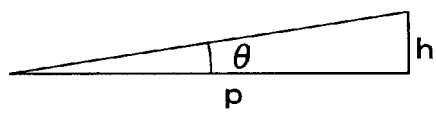

FIGS. 2A-2E are a first set of diagrams illustrating the detailed configuration of an example of the optical element according to the first embodiment of the present invention. FIG. 2A is a front view of the example of the optical element according to the first embodiment of the present invention, FIG. 2B is a bottom view of the example of the optical element according to the first embodiment of the present invention, and FIG. 2C is a side view of the example of the optical element according to the first embodiment of the present invention. Also, FIG. 2D is a diagram illustrating arrangement of the convex portions of the optical element shown in FIG. 2 in detail and FIG. 2E is a diagram illustrating β-decentering of the optical element shown in FIG. 2.

As shown in FIGS. 2A and 2B, an optical element 20 has an optical surface 21 and three convex portions 23 on a surface different from the optical surface 21, similarly to the optical element 10 shown in FIG. 1. The three convex portions 23 are provided at three points A, B and C on the surface 21 different from the optical surface 21, respectively. Also, the three convex portions 23 have forms identical to one another. In FIGS. 2A and 2B, x is the space between the center of the convex portion 23 at position A and the center of the convex portion at position B and p is the length of a perpendicular from the center of the convex portion 23 at position C to a straight line connecting the center of the convex portion 23 at position A and the center of the convex portion 23 at position B. Additionally, a foot of the perpendicular from the center of the convex portion 23 at position C to a straight line connecting the center of the convex portion 23 at position A and the center of the convex portion 23 at position B is present at the center of a line segment between the center of the convex portion 23 at position A and the center of the convex portion 23 at position B. That is, the center of the convex portion at position A, the center of the convex portion 23 at position B, and the center of the convex portion at position C form an isosceles triangle. Also, L is the length of the optical element 20 in the directions of a straight line connecting the center of the convex portion 23 at position A and the center of the convex portion 23 at position B, $h_0$ is the heights of the ends of the optical element 20 in the directions of a straight line connecting the center of the convex portion 23 at position A and the center of the convex portion 23 at position B, and h is the heights of the ends of the optical element 20 at the center of the convex portion 23 at position A or the center of the convex portion 23 at position B. Additionally, the optical element 20 is provided with a sinking surface 24.

Also, as shown in FIGS. 2A and 2D, a generating line 25 of the optical element 20 is generally a quadratic-functional curve with respect to a straight line connecting positions A and B of the convex portions 23 and the optical element 20 has a form deviating from the ideal form thereof (deforms), as shown in FIG. 1. Therefore, there is generally a relationship of $h=(x^2/L^2) \times h_0$ in the optical element 20 shown in FIG. 2. As a result, as shown in FIG. 2C, the relative arrangement between the convex portion 23 at position C and the convex portion 23 at position A or B deviates from the ideal arrangement thereof and the optical element 20 inclines around the center of the convex portion 23 at position C (β-decentering).

Herein, as shown in FIG. 2E, an angle θ of β-decentering equals to $\tan^{-1}$ (h/p) in regard to the β-decentering of the optical element 20. In the optical element 20, the three convex portions 23 are arranged on the surface 22 different from the optical surface 20 such that the angle of β-decentering is equal to or less than the specification value of the angle of β-decentering, that is, such that a relationship of "$\tan^{-1}$ (h/p)≦ the specification value of the angle of β-decentering" is satisfied. That is, the values of x and p in regard to the three convex portions are selected to satisfy relationships of "$\tan^{-1}$ (h/p)≦the specification value of an angle of β-decentering" and $h=(x^2/L^2) \times h_0$. Additionally, the specification value of an angle of β-decentering is a value determined depending on the form of the optical element and the optical property or properties required for the optical element.

Figure 3A:
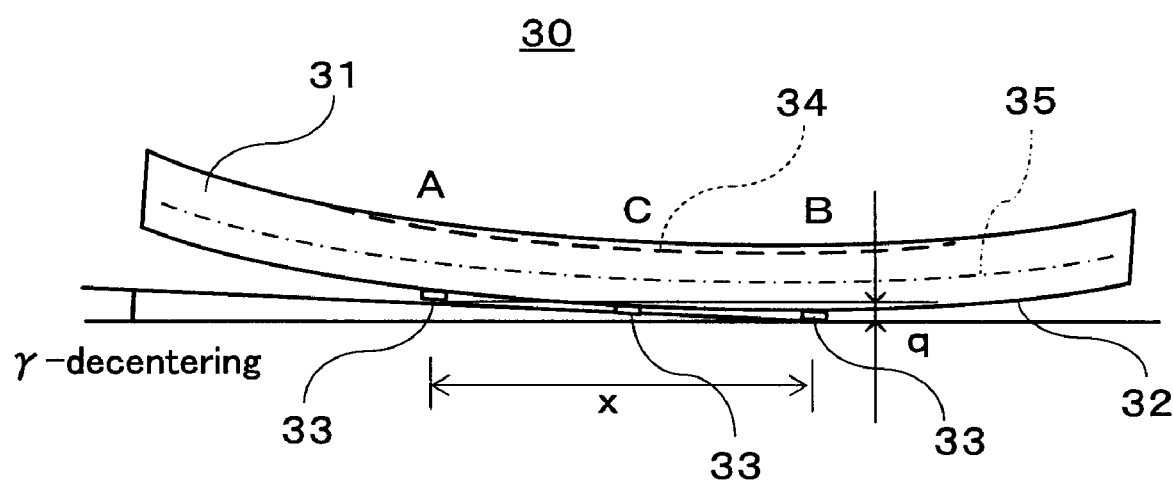
FIGS. 3A and 3B are a second set of diagrams illustrating the detailed configuration of an example of the optical element according to the first embodiment of the present invention.
Figure 3B:
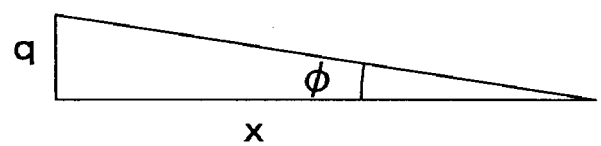

FIGS. 3A and 3B are a second set of diagrams illustrating the detailed configuration of an example of the optical element according to the first embodiment of the present invention. FIG. 3A is a front view of the example of the optical element according to the first embodiment of the present invention and FIG. 3B is a diagram illustrating γ-decentering of the optical element shown in FIG. 3.

As shown in FIG. 3A, an optical element 30 has an optical surface 31 and three convex portions 33 on a surface 32 different from the optical surface 31, similarly to the optical element 10 shown in FIG. 1. The three convex portions 33 are provided at positions A, B and C on the surface 32 different from the optical surface 31, respectively. Also, the three convex portions 33 have forms identical to one another. In FIG. 3A, x is the space between the center of the convex portion 33 at position A and the center of the convex portion 33 at position B and q is the height of the top face of the convex portion at position B (or A) with reference to the top surface of the convex portion at position A (or B). Additionally, the optical element 30 is provided with a sinking surface 34. Also, as shown in FIG. 3A, the generating line 25 of the optical surface 30 is generally a quadratic-functional curve with reference to a straight line connecting positions A and B of the convex portions 33. The optical element 30 has a form deviating from the ideal form thereof (deforms), as shown in FIG. 1. Therefore, in the optical element 30 shown in FIG. 3, there is generally a relationship of $h=(x^2/L^2) \times h_0$. As a result, as shown in FIG. 3A, the top surface of the convex portion 33 at position A and the top surface of the convex portion 33 at position B are not coplanar and the top surface of the convex portion 33 at position B (or A) inclines with respect to the top surface of the convex portion 33 at position A (or B) (γ-decentering).

Herein, as shown in FIG. 3B, an angle φ of γ-decentering equals to $\tan^{-1}$ (q/x) in regard to the γ-decentering of the optical element 30. In the optical element 30, the three convex portions 33 are arranged on the surface 32 different from the optical surface 30 such that the angle of γ-decentering is equals to or less than the specification value of an angle of γ-decentering, that is, a relationship of "$\tan^{-1}$ (q/x)≦the specification value of an angle of γ-decentering" is satisfied (in addition to the angle of β-decentering being equal to or less than the specification value of an angle of β-decentering, as described above with reference to FIG. 2). That is, the values of x and q in regard to the three convex portions are selected to satisfy a relationship of "$\tan^{-1}$ (q/x)≦the specification value of an angle of γ-decentering". Additionally, the specification value of an angle of γ-decentering is a value determined depending on the form of the optical element and the optical property or properties required for the optical element.

The second embodiment of the present invention is an optical element having an optical surface and at least three convex portions on a surface different from the optical element, in which, among the at least three convex portions, centers of two convex portions a space between whose centers is a maximum and a center of one convex portion a length of a perpendicular from whose center to a straight line connecting centers of the two convex portions is a maximum are positioned in a first circle which is centered on a center of gravity of a surface having the at least three convex portions and has a radius of L/2 or on the first circle, and L is a length of the optical element in directions of a straight line connecting centers of the two convex portions.

Also, in the second embodiment of the present invention, an optical element having an optical surface and at least three convex portions on a surface different from the optical element, and among the at least three convex portions, two convex portions a space between whose centers is a maximum (particular two convex portions) and one convex portion a length of a perpendicular from whose center to a straight line connecting centers of the two convex portions is a maximum (particular one convex portion) are similar to those of the optical element according to the first embodiment of the present invention.

When the centers of the particular two convex portions (A and B) and the center of the particular one convex portion (C) are positioned in a first circle which is centered on a center of gravity of a surface having at least three convex portions (A, B and C) and has a radius of L/2 or on the first circle, it becomes possible to obtain more easily the arrangement of the particular two convex portions (A and B) and particular one convex portion (C) such that a relationship of "$\tan^{-1}(h/p) \leq$ the first specification value" is satisfied. Additionally, L is the length of the optical element in the directions of a straight line connecting the centers of the particular two convex portions (A and B) (the distance between the both ends of the optical element). Also, the center of gravity of a surface having the at least three convex portions (A, B and C) is obtained by a publicly known method for calculating the center of gravity of a matter.

In this case, it becomes possible to provide an optical element capable of improving the precision of arrangement of the optical element (more easily).

In the optical element according to the second embodiment of the present invention, preferably, centers of the two convex portions and a center of the one convex portion are positioned in a first circle which is centered on a center of gravity of a surface having the at least three convex portions and has a radius of L/4 or on the first circle.

When the centers of the particular two convex portions (A and B) and the center of the particular one convex portion (C) are positioned in a first circle which is centered on a center of gravity of a surface having at least three convex portions (A, B and C) and has a radius of L/4 or on the first circle, it becomes possible to obtain more accurately the arrangement of the particular two convex portions (A and B) and the particular one convex portion (C) such that a relationship of $\tan^{-1}(h/p) \leq$ the first specification value is satisfied.

In this case, it becomes possible to provide an optical element capable of improving the precision of arrangement of the optical element (more accurately).

In the optical element according to the second embodiment of the present invention, preferably, centers of the two convex portions and a center of the one convex portion are positioned out of a second circle which is centered on a center of gravity of a surface having the at least three convex portions and has a radius of L/10 or on the second circle.

When the centers of the particular two convex portions (A and B) and the center of the particular one convex portion (C) are positioned out of a second circle which is centered on a center of gravity of a surface having at least three convex portions (A, B and C) and has a radius of L/10 or on the second circle, it becomes possible to obtain more easily the arrangement of the particular two convex portions (A and B) and particular one convex portion (C) such that a relationship of $\tan-1(q/x) \leq$ the second specification value is satisfied.

In this case, it becomes possible to provide an optical element capable of further improving the precision of arrangement of the optical element (more easily).

Figure 4:
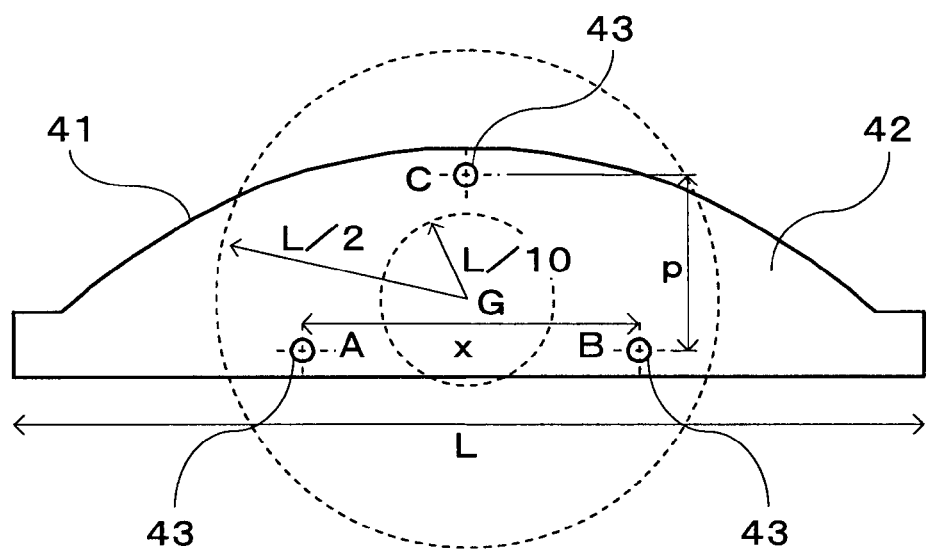
FIG. 4 is a diagram illustrating an example of the optical element according to the second embodiment of the present invention.

FIG. 4 is a diagram illustrating an example of the optical element according to the second embodiment of the present invention. FIG. 4 is also a front view of the example of the optical element according to the second embodiment of the present invention. As shown in FIG. 4, an optical element 40 according to the second embodiment of the present invention has an optical surface 41 and a surface 42 different from the optical surface 41. On the surface 42 different from the optical surface 41, three convex portions 43 are provided at positions A, B and C, respectively. Also, the three convex portions 43 have forms identical to one another. In FIG. 4, x is the space between the center of the convex portion 43 at position A and the center of the convex portion 43 at position B and p is the length of a perpendicular from the center of the convex portion 43 at position C to a straight line connecting the center of the convex portion 43 at position A and the center of the convex portion 43 at position B. Additionally, the foot of the perpendicular from the center of the convex portion 43 at position C to a straight line connecting the center of the convex portion 43 at position A and the center of the convex portion 43 at position B is present at the center of a line segment between the center of the convex portion 43 at position A and the center of the convex portion 43 at position B. That is, the center of the convex portion 43 at position A, the center of the convex portion 43 at position B, and the center of the convex portion 43 at position C form an isosceles triangle. Also, L is the length of the optical element 40 in the directions of a straight line connecting the center of the convex portion 43 at position A and the center of the convex portion 43 at position B. Also, G is the center of gravity of (the surface 42 different from the optical surface 41 of) the optical element 40.

Then, the three convex portions 43 at positions A, B and C are arranged on the surface 42 different from the optical surface 41 such that the centers of the three convex portions 43 at positions A, B and C are positioned in a first circle which is centered on the center of gravity G of the optical element 40 and has a radius of L/2. For example, the values of x and p are selected such that the centers of the three convex portions 43 at positions A, B and C are positioned in the first circle which is centered on the center of gravity G of the optical element 40 and has a radius of L/2.

Also, the three convex portions 43 at positions A, B and C are arranged on the surface 42 different from the optical surface 41 such that the centers of the three convex portions 43 at positions A, B and C are positioned out of a second circle which is centered on the center of gravity G of the optical element 40 and has a radius of L/10. For example, the values of x and p are selected such that the centers of the three convex portions 43 at positions A, B and C are positioned out of the second circle which is centered on the center of gravity G of the optical element 40 and has a radius of L/10.

In the optical element according to the first or second embodiment of the present invention, preferably, a cross sectional area(s) of at least one (and more preferably, all) of the at least three convex portions which is/are parallel to a surface different from the optical surface is/are unchanged or decrease(s) from a side of the surface different from the optical surface to an opposite side of the surface different from the optical surface. In other words, at least one (and more preferably, all) of the at least three convex portions has/have the same cross-sectional area or is/are thinned down from a side of the surface different from the optical surface to an opposite side of the surface different from the optical surface.

In this case, the optical element is a plastic optical element, and when the optical element is manufactured by molding, the cross-sectional area of a convex portion which is unchanged or decreases from the side of the surface different from the optical surface to the opposite side of the surface different from the optical surface provides a draft for releasing the optical element from a die more easily. Additionally, the convex portion of the optical element extends in directions parallel to the directions of releasing resin from a die.

Thus, when the cross-sectional area(s) of at least one (and more preferable, all) of the at least three convex portions which is/are parallel to the surface different from the optical surface is/are unchanged or decrease(s) from the side of the surface different from the optical surface to the opposite side of the surface different from the optical surface and the optical element is an plastic optical element, it become(s) possible to release from (take out of) a die a molding product of the optical element more easily since the convex portion(s) of the optical element has/have a draft(s). As a result, it becomes possible to improve the productivity of the optical element.

Figure 5:
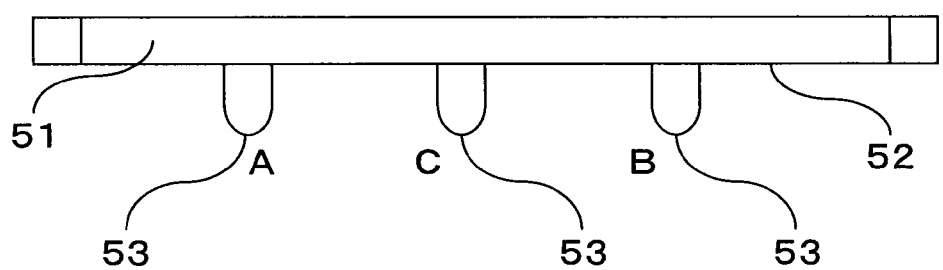
FIG. 5 is a diagram illustrating an example of a convex portion having a draft provided on a surface different from the optical surface of an optical element.

FIG. 5 is a diagram illustrating an example of a convex portion having a draft provided on a surface different from the optical surface of an optical element. The optical element 50 shown in FIG. 5 has an optical surface 51 and a surface 52 different from the optical surface 51, similarly to the optical element 10 as shown in FIG. 1. On the surface 52 different from the optical surface 51, the three convex portions 53 are provided at positions A, B and C, respectively. Also, the three convex portions 53 have forms identical to one another. Then, the three convex portions 53 have drafts the cross-sectional areas of which are parallel to the surface 52 different from the optical surface 51 and are unchanged or decrease from the side of the surface 52 different from the optical surface 51 to the opposite side of the surface 52 different from the optical surface 51.

The optical element according to the first or second embodiment of the present invention is preferably an optical imaging element for imaging light generating from a light source on an object to be scanned with the light via the optical surface.

In this case, it becomes possible to provide an optical imaging element capable of further improving the precision of arrangement of the optical imaging element. Also, it also becomes possible to reduce the degradation of the optical property (such as warping of a scanning line) of an optical imaging element since it becomes possible to further improve the precision of arrangement of the optical imaging element.

The light source is not particularly limited, and for example, there is provided a laser light source capable of generating a light beam, etc. The light generating a light source is not particularly limited, and for example, there is provided visible light or infrared light which is hardly absorbed or is not absorbed at all by the optical imaging element, etc. Also, the object to be scanned with light is not particularly limited, and for example, a photoconductor, etc., are provided. As an optical imaging element, for example, there is provided a plastic optical element such as a plastic lens with a high precise optical surface and a plastic mirror with a high precise optical surface, which may be used in an optical scanning system. Additionally, the at least three convex portions of the optical imaging element may be of determining the arrangement of the optical element in sub-scanning directions.

When the optical element according to the first or second embodiment of the present invention is a plastic optical element, it becomes possible to manufacture a plastic optical element according to the first or second embodiment of the present invention by using, for example, a method for molding a plastic molding product as disclosed in JP-A-11-028745, the entire contents of which are hereby incorporated by reference, or a method for manufacturing a plastic molding product as disclosed in JP-A-2000-141413, the entire contents of which are hereby incorporated by reference. For example, the method for molding a plastic molding product disclosed in JP-A-11-028745 includes preparing a pair of dies having at least one transcription surface and provided with at least one slidable cavity die piece on a surface except the transcription surface wherein at least one cavity is formed by the transcription surface and the cavity die piece, heating the dies to and keeping them at a temperature lower than the softening temperature of a resin, ejecting the resin heated to a temperature equal to or higher than the softening temperature and melted into the cavity and filling the cavity with the resin, then contacting the resin to the transcription surface by generating a pressure of the resin on the transcription surface, subsequently cooling the resin at a temperature equal to or lower than the softening temperature, and then opening the dies to take out the resin, wherein when the melted resin is cooled to a temperature lower than the softening temperature, at least one cavity die portion is slid such that it is separated from the resin, thereby forming a void between the resin and the cavity die piece forcedly.

When the method for molding a plastic molding product as disclosed in JP-A-11-028745 or the method for manufacturing a plastic molding product as disclosed in JP-A-2000-141413 is used, resin shrinkage caused by the temperature difference in dies when melted resin is cooled to a temperature lower than the softening temperature thereof and resin shrinkage caused by cooling after dies are opened to take out resin could be caused. In this case, the profile of a plastic optical element may be warped or the generating line of a plastic optical element may be also warped. Additionally, a plastic optical element often has a profile warpage approximating to a quadratic function from the center of the plastic optical element. As such a profile warpage of the plastic optical element is caused, there is concern that the optical element may be deviated from predetermined arrangement in extension directions of the convex portions of the optical element (that is, β-decentering may increase) when the optical element is arranged. As a result, there is concern that the optical property of the optical element (such as color shift) may be degraded and it may be difficult to keep the quality of the optical element stably. However, even if a plastic optical element is manufactured by a method as described above, it becomes possible to improve the precision of arrangement of the optical element due to the optical element according to the first or second embodiment of the present invention.

The optical elements 10, 20, 30 and 40 as shown in FIGS. 1, 2, 3 and 4 may be optical imaging elements for imaging light generating from a light source on an object to be scanned with the light via an optical surface.

Additionally, although the optical element according to the first embodiment of the present invention and the optical element according to the second embodiment of the present invention are described separately, a configuration of the optical element according to the first embodiment of the present invention and a configuration of the optical element according to the second embodiment of the present invention can be combined in the all embodiments of the present invention.

Specifically, for example, there can be provided an optical element having an optical surface and at least three convex portions on a surface different from the optical surface, in which, among the at least three convex portions, two convex portions a space between whose centers is a maximum and one convex portion a length of a perpendicular from whose center to a straight line connecting centers of the two convex portions is a maximum satisfy a relationship of $\tan^{-1}(h/p) \leq a$ first specification value, wherein h is a greater one of heights of the optical element at centers of the two convex portions with reference to a tangential plane of the optical element at a position of a foot of the perpendicular and p is a length of the perpendicular, and, among the at least three convex portions, centers of two convex portions a space between whose centers is a maximum and a center of one convex portion a length of a perpendicular from whose center to a straight line connecting centers of the two convex portions is a maximum are positioned in a first circle which is centered on a center of gravity of a surface having the at least three convex portions and has a radius of L/2 or on the first circle and L is a length of the optical element in directions of a straight line connecting centers of the two convex portions.

In addition to the configuration described above, there can be also provided an optical element, in which the two convex portions and the one convex portion satisfy a relationship of $\tan^{-1}(q/x) \leq$ a second specification value, wherein q is a height of a top surface of one convex portion of the two convex portions with reference to a top surface of the other convex portion and x is a space between centers of the two convex portions, and centers of the two convex portions and a center of the one convex portion are positioned out of a second circle which is centered on a center of gravity of a surface having the at least three convex portions and has a radius of L/10 or on the second circle.

The third embodiment of the present invention is an optical scanning device for scanning an object by using light generating from a light source which device includes at least one optical element, in which the at least one optical element includes the optical element according to the first embodiment of the present invention or the optical element according to the second embodiment of the present invention.

According to the third embodiment of the present invention, it becomes possible to provide an optical scanning device which includes an optical element capable of improving the precision of arrangement of the optical element.

Additionally, the light source, the light generating from a light source, and the object are those described above. Also, the optical scanning device may include a rotary polygon mirror for deflecting light generating from a light source such as a laser light source.

Furthermore, the optical scanning device may include a housing for supporting the optical element according to the first or second embodiment of the present invention. Also, the optical element according to the first or second embodiment of the present invention may be bonded to a housing. The housing may have at least three (and preferably, three) convex portions (such as projections) for supporting the optical element according to the first or second embodiment of the present invention. In this case, a surface different from an optical surface of the optical element according to the first or second embodiment of the present invention (on which former surface the at least three convex portions of the optical element may not be provided) may be supported by at least three convex portions of a housing. Preferably, the at least three convex portions of a housing are arranged in the housing, similarly to the arrangement of the at least three convex portions of the optical element described above. Also, when a housing has at least three convex portions, it becomes possible to support a surface different from an optical surface of the optical element according to the first or second embodiment of the present invention on which former surface no convex portion is provided, by the at least three convex portions of the housing, and to support another optical element by at least three convex portions of the optical element according to the first or second embodiment of the present invention. That is, it becomes possible to use both the surface different from an optical surface on which former surface no convex potion is provided and the surface different from an optical surface on which former surface at least three convex portions are provided, in the optical element of the first or second embodiment of the present invention. As a result, it becomes possible to improve the productivity of an optical scanning device which includes an optical element and a housing.

The number of the optical element according to the first or second embodiment which is included in the optical scanning device may be plural. Plural optical elements may be stacked and an optical element in the stacked plural optical elements is supported by at least three convex portions of a lower optical element for supporting the optical element. Also, a surface different from the optical surface of an optical element in the stacked plural optical elements is bonded to the top surfaces of at least three convex portions of a lower optical element for supporting the optical element. That is, a surface different from the optical surface of one optical element (on which former surface at least three convex portions of the optical element may not be provided) is a bonded surface and the top surfaces of at least three convex portions of another optical element, which support the optical element, are bonding surfaces, whereby those optical elements are bonded to each other.

Thus, when plural optical elements are bonded and stacked integrally, it becomes possible to improve the precision of arrangement of plural optical elements since at least three convex portions provided on an optical element in the plural optical elements according to the first or second embodiment of the present invention are used to bond the plural optical elements.

Also, one optical element according to the first or second embodiment is preferably bonded to another optical element according to the first or second embodiment or a housing by using a photo-curable adhesive. More particularly, a surface (bonded surface) different from an optical surface of one optical element (on which former surface at least three convex portions of an optical element may not be provided) is bonded to the top surfaces (binding surfaces) of at least three convex portions of another optical element or a housing which supports the optical element, by using a photo-curable adhesive. When the optical element is formed of a transparent material, after a photo-curable adhesive is applied on a bonded surface of one optical element and/or a bonding surface of another optical element or a housing and the bonded surface of one optical element and/or the bonding surface of another optical element or a housing are contacted to each other, the photo-curable adhesive is irradiated with light. Thus, one optical element and another optical element or a housing are bonded to each other by curing a photo-curable adhesive.

It becomes possible to bond one optical element to another optical element or a housing more easily, by using a photo-curable adhesive and bonding one optical element according to the first or second embodiment to another optical element according to the first or second embodiment or a housing. As a result, it becomes possible to improve the productivity of an optical scanning device which includes an optical element and/or a housing.

Also, the plural optical elements according to the first or second embodiment preferably have identical forms. Herein, the term "identical" includes both being completely identical and being regarded as substantially identical.

When the plural optical elements according to the first or second embodiments have identical forms, the thermal expansion or shrinkage of the plural optical elements which is caused by the variation of ambient temperature is similar, and it becomes possible to reduce the variation of the optical property of the plural optical elements according to the first or second embodiment which is caused by the variation of ambient temperature. Also, when the plural optical elements according to the first or second embodiments are plastic optical elements, it becomes possible to use the same die and the same molding machine to mold the optical elements. As a result, it becomes possible to reduce the productivity of the plural optical elements and it becomes possible to improve the productivity of an optical scanning device which includes plural optical elements.

Also, the plural optical elements according to the first or second embodiments are preferably formed of a material(s) with an identical thermal expansion coefficient. Herein, the term "identical" includes both being completely identical and being regarded as substantially identical.

When the plural optical elements according to the first or second embodiment are formed of a material(s) with an identical thermal expansion coefficient, the thermal expansion or shrinkage of the plural optical elements which is caused by the variation of ambient temperature is similar and it becomes possible to reduce the variation of the optical property of the plural optical element according to the first or second embodiment which is caused by the variation of ambient temperature.

The optical element according to the first or second embodiment of the present invention is preferably bonded to another optical element or a housing while the optical axis of the optical element is adjusted. More specifically, while the optical property of the optical element according to the first or second embodiment is measured, the position of the optical axis of the optical element according to the first or second embodiment of the present invention is adjusted by using an appropriate jig or equipment. Then, when a desired optical property of the optical element according to the first or second embodiment of the present invention is obtained, the optical element is bonded to another optical element or a housing. As a result, it becomes possible to improve the precision of arrangement of the optical element according to the first or second embodiment of the present invention. Also, since it becomes possible to reduce the variation of the optical property of an optical element (such as a shift of a writing position in main-scanning directions) which is caused by the dispersion of the precision of a component in regard to plural optical elements, it becomes possible to provide an optical scanning device with a stable performance which includes an optical element.

Figure 6:
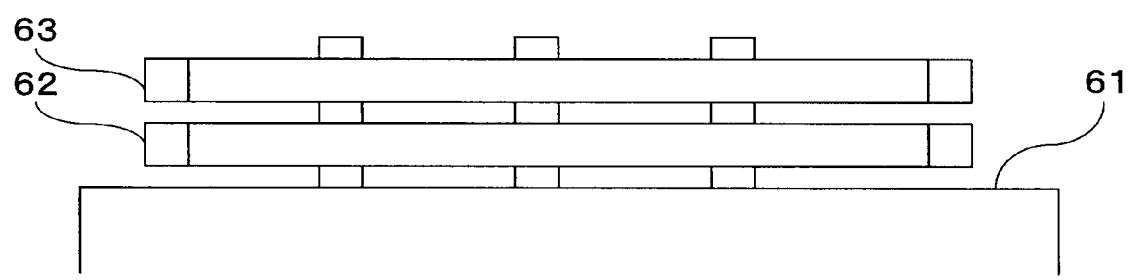
FIG. 6 is a diagram illustrating an example of the arrangement of a housing and plural optical elements.

FIG. 6 is a diagram illustrating an example of the arrangement of a housing and plural optical elements. In the arrangement of a housing and plural optical elements which is shown in FIG. 6, a first optical element 62 is bonded to a housing 61 and a second optical element 63 is bonded to the first optical element 62. The housing 61 has three convex portions. The first optical element and the second optical element are identical optical elements (optical elements having identical forms and made of an identical material) according to the first or second embodiment of the present invention and each of them has three convex portions. Then, the three convex portions of the housing 61 are bonded to a surface of the first optical element 62 on which no convex portion is provided and the three convex portions of the first optical element 62 are bonded to a surface of the second optical element 63 on which no convex portion is provided. A photo-curable adhesive is used for the bonding of the first optical element 62 to the housing 61 and the bonding of the second optical element 63 to the first optical element 62. Additionally, the first optical element 62 and the second optical element 63 are bonded to the housing 61 and the first optical element 62, respectively, while the optical axis of the first optical element 62 and the optical axis of the second optical element 63 are adjusted.

As an optical scanning device, for example, there is provided an optical scanning system used for a digital copying machine using a laser, a laser printer, a facsimile apparatus, etc.

Figure 7A:
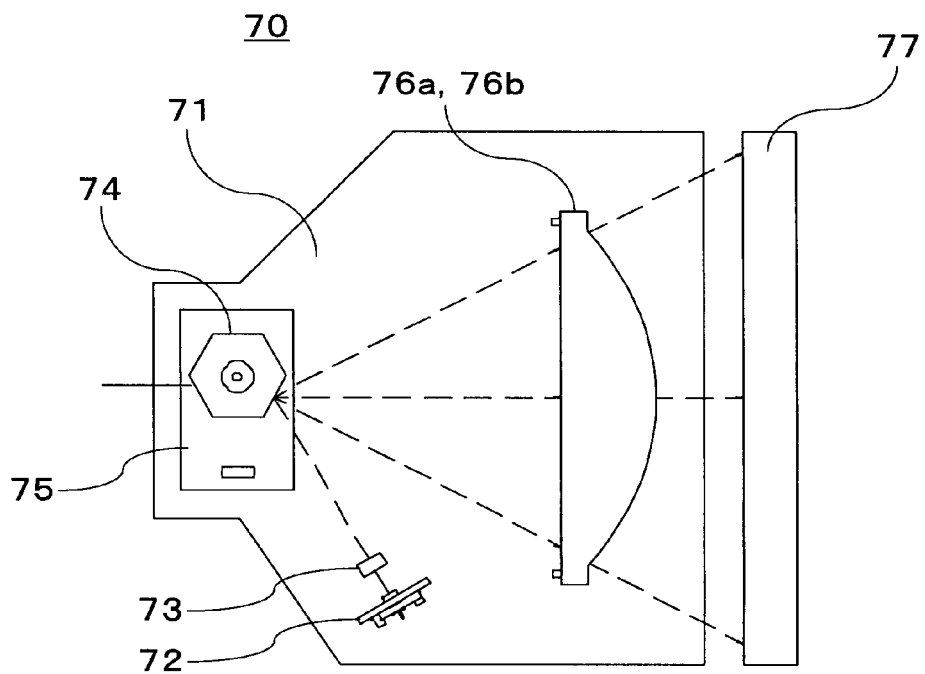
FIGS. 7A and 7B are diagrams illustrating the first example of an optical scanning system as an optical scanning device.
Figure 7B:
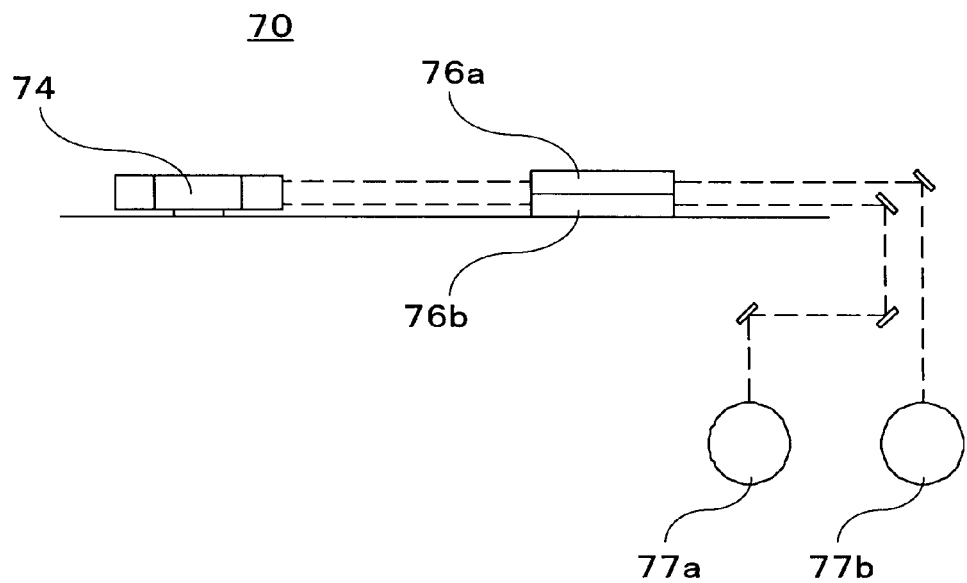

FIGS. 7A and 7B are diagrams illustrating the first example of an optical scanning system as an optical scanning device. FIG. 7A is a plan view of the first example of an optical scanning system and FIG. 7b is a side view of the first example of an optical scanning system. An optical scanning system 70 shown in FIG. 7 includes a housing formed of a resin, a laser light source 72 for generating two light beams, such as a semiconductor laser, a cylindrical lens 73, a polygon scanner unit 75 including a rotary polygon mirror 74, and stacked two optical imaging elements 76a, 76b (according to the first or second embodiment of the present invention). Two light beams generating from the laser light source 72 transmit through the cylindrical lens 73 for adjusting the beam diameters of the two light beams and are incident on one mirror surface of the rotary polygon mirror 74 as a deflector for deflecting the traveling directions of the two light beams. The rotary polygon mirror 74 assembled in the polygon scanner unit 75 rotates at a uniform angular velocity and deflects the two laser light beams at the uniform angular velocity. The two laser light beams deflected by the rotary polygon mirror 74 are incident on the stacked two optical imaging elements 76a, 76b, respectively, and are imaged on two photoconductors 77a, 77b provided outside the housing 71 by the two optical imaging elements 76a, 76b and plural reflective mirrors for reflecting the light beams. Also, the two light beams imaged by the two optical imaging elements 76a, 76b scan the two photoconductors 77a, 77b, at a uniform velocity, respectively. Additionally, the laser light source 72 may be composed of two laser light sources for generating two beams.

Figure 8A:
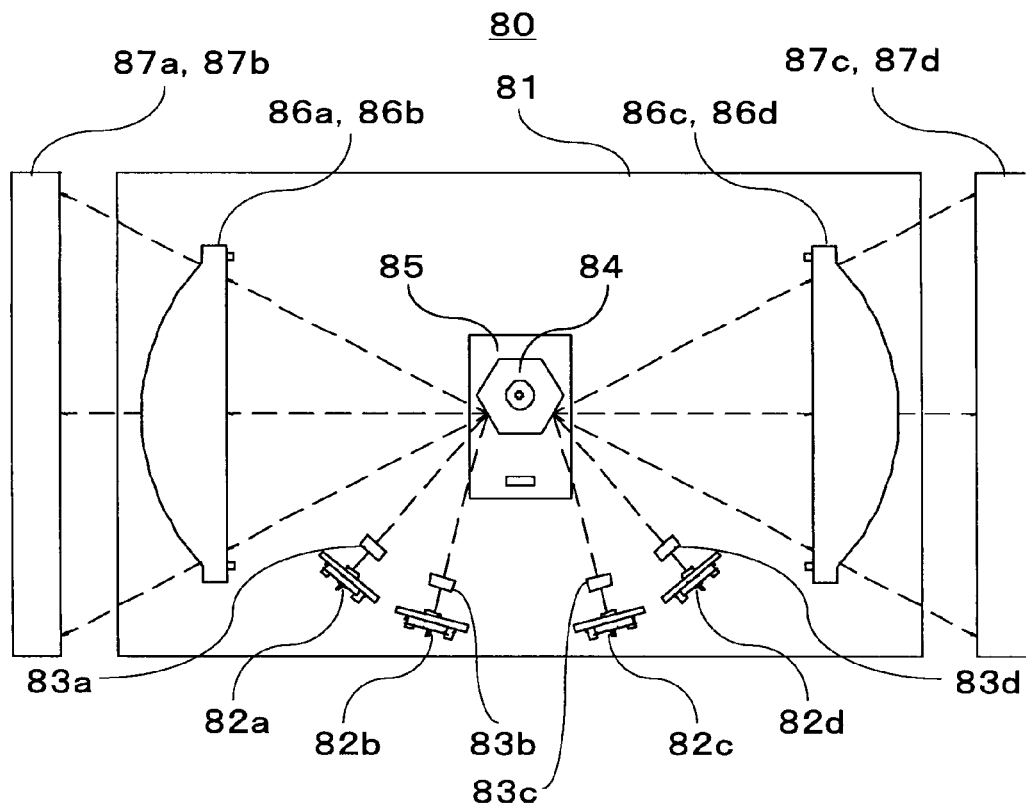
FIGS. 8A and 8B are diagrams illustrating the second example of an optical scanning system as an optical scanning device for a multi-color image formation.
Figure 8B:
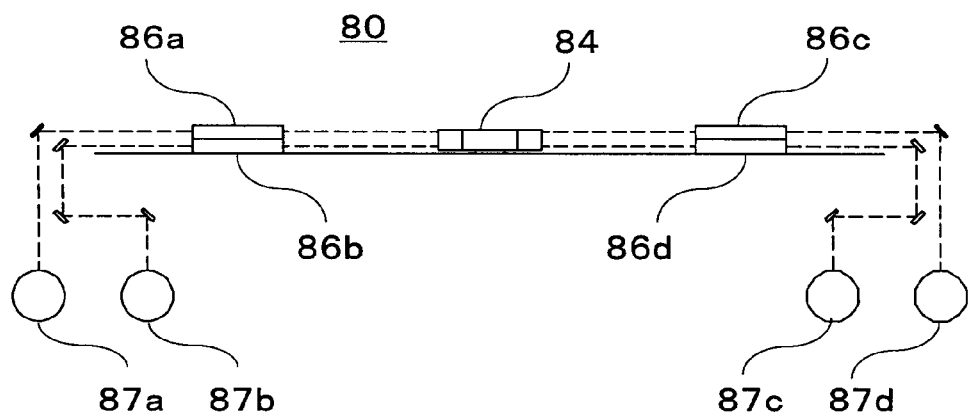

FIGS. 8A and 8B are diagrams illustrating the second example of an optical scanning system as an optical scanning device for a multi-color image formation. FIG. 8A is a plan view of the second example of an optical scanning system and FIG. 8b is a side view of the second example of an optical scanning system.

An optical scanning system 80 shown in FIG. 8 includes a housing 81 formed of a resin, four laser light sources 82a, 82b, 82c, 82d each of which generates one light beam, such as semiconductor lasers, four cylindrical lenses 83a, 83b, 83c, 83d, a polygon scanner unit 85 which includes a rotary polygon mirror 84, and four optical imaging elements 86a, 86b, 86c, 86d (according to the first or second embodiment of the present invention). The two optical imaging elements 86a, 86b are stacked and the other two optical imaging elements 86c, 86d are stacked. Four light beams generating from the four laser light sources 82a, 82b, 82c, 82d transmit through the four cylindrical lenses 83a, 83b, 83c, 83d for adjusting the beam diameters of the light beams, respectively, and are incident on a mirror surface of the rotary polygon mirror 84 as a deflector for deflecting the traveling directions of the four light beams. Two light beams generating from the two laser light sources 82a, 82b are incident on one mirror surface of the rotary polygon mirror 84 and two light beams generating from the two laser light sources 82c, 82d are incident on another mirror surface of the rotary polygon mirror 84. The rotary polygon mirror 74 assembled in the polygon scanner unit 75 rotates at a uniform angular velocity and deflects the four laser light beams at the uniform angular velocity. The four laser light beams deflected by the rotary polygon mirror 84 are incident on the four optical imaging elements 86a, 86b, 86c, 86d, respectively, and are imaged on four photoconductors 87a, 87b, 87c, 87d provided outside the housing 81 by the four optical imaging elements 86a, 86b, 86c, 86d and plural reflective mirrors for reflecting the light beams. Also, the four light beams imaged by the four optical imaging elements 86*a*, 86*b*, 86*c*, 86*d* scan the four photoconductors 87*a*, 87*b*, 87*c*, 87*d* at a uniform velocity, respectively. Additionally, a set of four optical scanning systems as shown in FIG. 7 may be used as an optical scanning device for multi-color image formation.

The fourth embodiment of the present invention is an image formation apparatus for forming an image on a photoconductor which apparatus includes an optical scanning device for scanning the photoconductor by using light generating from a light source, in which the optical scanning device includes the optical scanning device according to the third embodiment of the present invention.

According to the fourth embodiment of the present invention, it becomes possible to provide an image forming apparatus which includes an optical scanning device which includes an optical element capable of improving the precision of arrangement of the optical element.

As an image forming apparatus, it becomes possible to provide, for example, a digital copying machine using a laser, a laser printer, a facsimile apparatus, etc.

Figure 9:
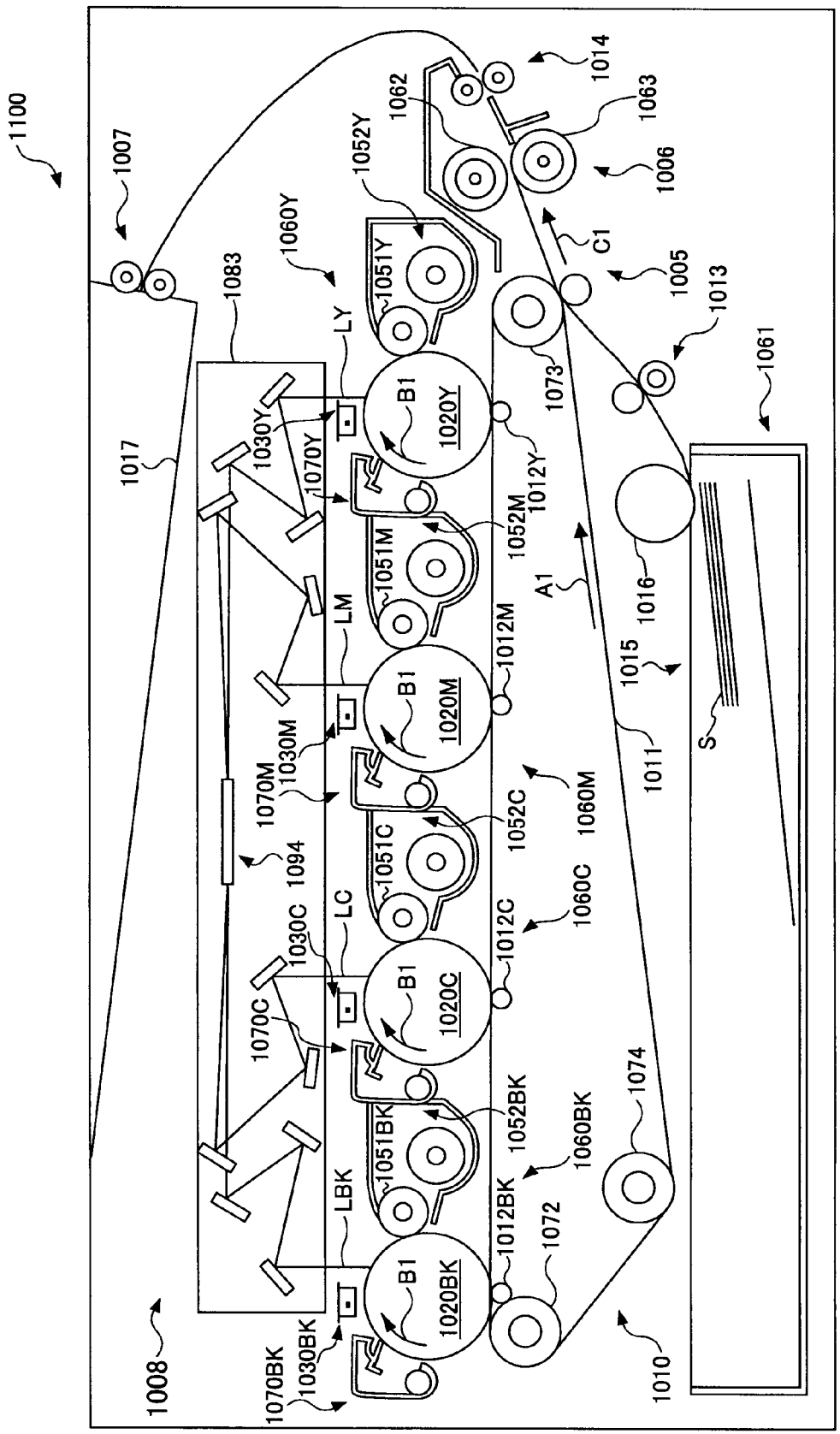
FIG. 9 is a diagram illustrating an example of an image forming apparatus which is a multi-color image forming apparatus capable of forming a color image.

FIG. 9 is a diagram illustrating an example of an image forming apparatus which is a multi-color image forming apparatus capable of forming a color image.

An image forming apparatus 1100 is a color laser printer, and however, may be another image forming apparatus such as another type of printer, a facsimile, a copying machine and a complex machine of copying machine and printer. The image forming apparatus 1100 conducts image formation processing based on an image signal(s) corresponding to image information received from exterior. This similarly applies to the case that the image forming apparatus 1100 is used as a facsimile. The image forming apparatus 1100 is capable of conducting image formation on any sheet-shaped recording medium, which may be an OHP sheet, a board such as a card and a postcard, or an envelop, as well as a normal paper sheet that is commonly used for copying, etc.

The image forming apparatus 1100 is a tandem-type image forming apparatus having a tandem structure in which plural photoconductor drums 1020Y, 1020M, 1020C, 1020BK as image carriers are juxtaposed which are capable of forming picture images as images corresponding to colors obtained by color separation into respective colors of yellow, magenta, cyan and black, respectively. The photoconductor drums 1020Y, 1020M, 1020C, 1020BK have identical diameters and are arranged at equal spaces at the side of outer surface, that is, the side of image-making face, of a transcription belt 1011 as an intermediate transcription belt which is an endless belt arranged approximately at the center portion inside the body of the image forming apparatus 1100.

The transcription belt 1011 is movable to the direction of arrow A1 while it opposes to the respective photoconductor drums 1020Y, 1020M, 1020C, 1020BK. Visible images, that is, toner images formed on the respective photoconductor drums 1020Y, 1020M, 1020C, 1020BK are superposed to one another and transcribed onto the transcription belt 1011 which moves to the direction of arrow A1, and subsequently, are transcribed on a transcription paper sheet S at once, which is a transcription medium being recording medium.

During a process in which the transcription belt 1011 moves to the direction of A1, the superposition and transcription onto the transcription belt 1011 are conducted at the positions directly under the respective photoconductor drums 1020Y, 1020M, 1020C, 1020BK, that is, transcription positions, by applying voltages from primary transcription rollers 1012Y, 1012M, 1012C, 1012BK as transcription chargers arranged at the respective positions opposing to the respective photoconductor drums 1020Y, 1020M, 1020C, 1020BK via the transcription belt 1011 and shifting the timing of the voltage applications from the upstream side to the downstream side along the direction of A1, such that the toner images formed on the respective photoconductor drums 1020Y, 1020M, 1020C, 1020BK are superposed and transcribed at the same position of the transcription belt 1011.

The transcription belt 1011 is an elastic belt whose entire layers are configured by using elastic members such as rubber members. The transcription belt 1011 may be a single-layer elastic belt, may be an elastic belt a part of which is an elastic member, or may be an inelastic belt, for which conventionally used fluorine-containing resins, polycarbonate resins, polyimide resins, etc., may be used.

The respective photoconductor drums 1020Y, 1020M, 1020C, 1020Bk are juxtaposed in this order from the upstream side along the direction of A1. The respective photoconductor drums 1020Y, 1020M, 1020C, 1020BK are included in imaging stations 1060Y, 1060M, 1060C, 1060BK which are image forming parts or image-making parts for forming yellow, magenta, cyan and black images, respectively.

The image forming apparatus 1100 includes: the four imaging stations 1060Y, 1060M, 1060C, 1060BK; a transcription belt unit as a belt unit arranged to be under and to oppose to the respective photoconductor drums 1020Y, 1020M, 1020C, 1020Bk and provided with the transcription belt 1011; a secondary transcription roller 1005 which is a paper sheet transcription belt as a transcription member arranged to oppose to the transcription belt 1011, contacting the transcription belt 1011 and revolving to the same direction as that of the transcription belt 1011 at the contact position of the transcription belt 1011; a cleaning device, which is not shown in the figure, as an intermediate transcription belt cleaning device which is arranged to oppose to the transcription belt 1011 and is an intermediate cleaning blade for cleaning the transcription belt 1011; and an optical scanning device 1008 as a light writing device which is a writing device arranged to be over and to oppose to the imaging stations 1060Y, 1060M, 1060C, 1060BK.

The image forming apparatus 1100 also includes: a sheet-feeding device 1061 on which transcription paper sheets S are stacked, which paper sheets are delivered to between the photoconductor drums 1020Y, 1020M, 1020C, 1020BK and the transcription belt 1011; a resist roller pair for delivering a recording paper sheet S delivered from the sheet feeding device 1061, to a transcription part between the transcription belt 1011 and the secondary transcription roller 1005 at a predetermined timing which is adapted to the timing for forming toner images in the imaging stations 1060Y, 1060M, 1060C, 1060BK; and a sensor for sensing that the leading end of the transcription paper sheet S reaches the resist roller pair 1013, which is not shown in the figure.

The image forming apparatus 1100 also includes: a fixation device 1006 as a roller-fixation-type-fixation unit for fixing the toner image(s) on the approaching transcription paper sheet S on which the toner image(s) has/have been transcribed and which is delivered to the direction of arrow C1; a delivery roller 1014 for delivering the transcription paper sheet S on which fixation has been made; a paper sheet ejection roller 1007 for ejecting the transcription paper sheet S delivered by the delivery roller 1014 to the outside of the body of the image forming apparatus 1100; a paper sheet ejection tray 1017 for stacking the transcription paper sheets S ejected to the outside of the body of the image forming apparatus by the paper sheet ejection roller 1007, which tray is arranged on the top of the body of the image forming apparatus 1100; and toner bottles filled with toners of respective colors of yellow, magenta, cyan and black, which are not shown in the figure.

The transcription belt unit 1010 includes as well as the transcription belt 1011, the primary transcription rollers 1012Y, 1012M, 1012C, 1012BK, a driving roller 1072 being a driving member, transcription entrance roller 1073 and tension roller 1074 as plural tensioning members on which a transcription belt 1011 is tensioned; and a spring as a pushing means for pushing the tension roller 1074 such that the tension of the transcription belt 1011 increases, which spring is not shown in the figure. The driving roller 1072 is rotationally driven by the driving of a motor as a driving source which is not shown in the figure, whereby the transcription belt 1011 is rotationally driven to the direction of A1.

The sheet feeding device 1061 includes the paper sheet feeding tray 1015 on which sheets S are stacked, and a paper sheet feeding control roller 1016 for delivering the sheets S stacked on the paper sheet feeding tray 1015. The fixation device 1006 includes a fixation roller 1062 which includes a heat source and a pressurizing roller 1063 which pressurizes and contacts the fixation roller 1062, and the transcription paper sheet S on which a toner image(s) is/are carried passes through the fixation part which is a pressurizing and contacting part of the fixation roller 1062 and pressurizing roller 1063, at which the carried toner image(s) is/are fixed on the surface of the transcription paper sheet S due to the application of heat and a pressure.

The optical scanning device 1008 emits beams LY, LM, LC, LK which are laser light beams as laser beams for forming latent images based on image signals, and surfaces to be scanned which are composed of the surfaces of the photoconductor drums 1020Y, 1020M, 1020C, 1020BK are scanned with and exposed to the light beams.

In regard to the imaging stations 1060Y, 1060M, 1060C, 1060BK, the configuration of one of them, the configuration of the imaging station 1060Y with the photoconductor drum 1020Y, is described representatively. Additionally, since the substantially identical matters apply to the configurations of other imaging stations, numerical references corresponding to the numerical references attached to the components of the imaging station 1060Y are conveniently attached to the components of the other imaging stations and the detailed descriptions thereof are appropriately omitted in the following descriptions, wherein the terminal symbols Y, M, C, K attached to the numerical references denote components for conducting yellow, magenta, cyan and black image formation, respectively.

The imaging station 1060Y with the photoconductor drum 1020Y includes a primary transcription roller 1012Y, a cleaning device 1070Y as cleaning means for cleaning the photoconductor drum 1020Y, a charging device 1030Y which is a charger as a charging device or charging means for charging the photoconductor drum 1020Y at a high voltage, and a development device 1050Y which is a developer or developing means for development on the photoconductor drum 1020Y, around the photoconductor drum 1020Y to the rotational direction of B1 being the clockwise direction in the figure. The development device 1050Y includes a development roller 1051Y arranged at the position opposing to the photoconductor drum 1020Y and a toner cartridge 1052Y for supplying toner to the development roller 1051Y.

In the configurations described above, the surface of the photoconductor drum 1020Y is uniformly charged by the charging device 1030Y with the rotation thereof to the direction of B1 and a latent image corresponding to a color of yellow is formed by the exposure and scanning with the beam LY from the optical scanning device 1008. The formation of this latent image is conducted by scanning with the beam LY in the main-scanning directions which are directions perpendicular to the paper surface and scanning to the sub-scanning direction which is a rotational direction of the photoconductor drum 1020Y, due to the rotation of the photoconductor drum 1020Y to the direction of B1.

Charged toner with a color of yellow which is supplied from the development device 1050Y adheres to thus formed latent image, for yellow color development and visualization of the image, and a toner image which is a visual image with a color of yellow obtained by the development is primarily transcribed onto the transcription belt 1011 which is moved to the direction of A1 by the primary transcription roller 1012Y. The contaminants such as remaining toner after the transcription are scraped, removed, and stocked by the cleaning device 1070Y, and the photoconductor drum 1020Y is subjected to subsequent charge-elimination and charging by the charging device 1030Y.

For the other photoconductor drums 1020C, 1020M, 1020BK, respective color toner images are also formed similarly, and the formed respective color toner images are primarily transcribed sequentially at the same position of the transcription belt 1011 which is moved to the direction of A1 by the primary transcription roller 1012C, 1012M, 1012BK. The toner images superposed on the transcription belt 1011 move to a transcription part which is a secondary transcription part and is the position opposing to the secondary transcription roller 1005, with the rotation of the transcription belt 1011 to the direction of A1, and are secondarily transcribed onto the transcription paper sheet S in the transcription part.

The transcription paper sheet S delivered between the transcription belt 1011 and the secondary transcription roller 1005 is fed from the sheet feeding device 1061 and delivered by the resist roller pair 1013 at the timing at which the leading edge of the toner images on the transcription belt 1011 opposes to the secondary transcription roller 1005, based on a detection signal of the sensor.

When all the color toner images are transcribed and carried on the transcription paper sheet S at once, are delivered to the direction of C1, enter the fixation device 1006, and pass through a fixation part between the fixation roller 1062 and the pressurizing roller 1063, the carried toner images are fixed due to the application of heat and a pressure. In this fixation process, a color image which is a composite color image is formed on the transcription paper sheet S, whereby a permanent image is obtained. The transcription paper sheets S which have passed through the fixation device 1006 and on which fixation has been conducted pass through the delivery roller 1014 and the paper sheet ejection roller 1007, and are stacked on the paper sheet ejection tray 1017 on the top of the body of the image forming apparatus 1100. On the other hand, the transcription belt 1011 on which the secondary transcription has been finished is cleaned by the cleaning device and is prepared for next primary transcription.

Practical Example 1

Figure 10A:
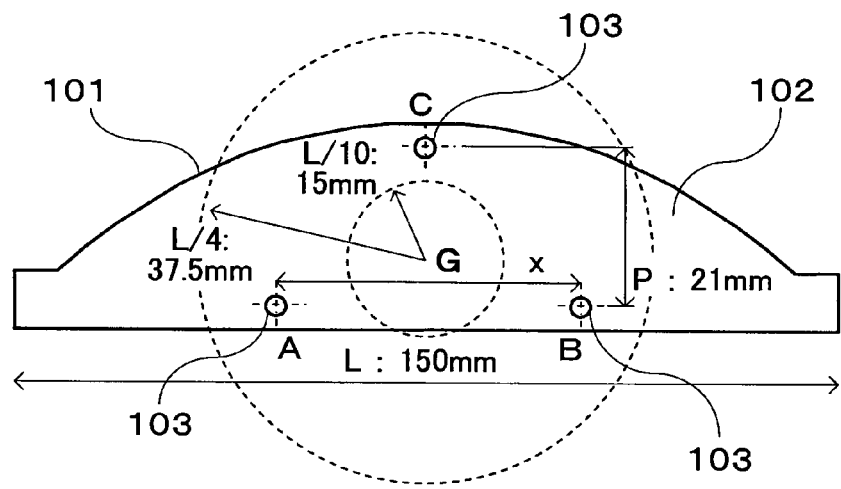
FIGS. 10A and 10B are diagrams showing the first practical example of the optical element according to the first or second embodiment of the present invention.
Figure 10B:
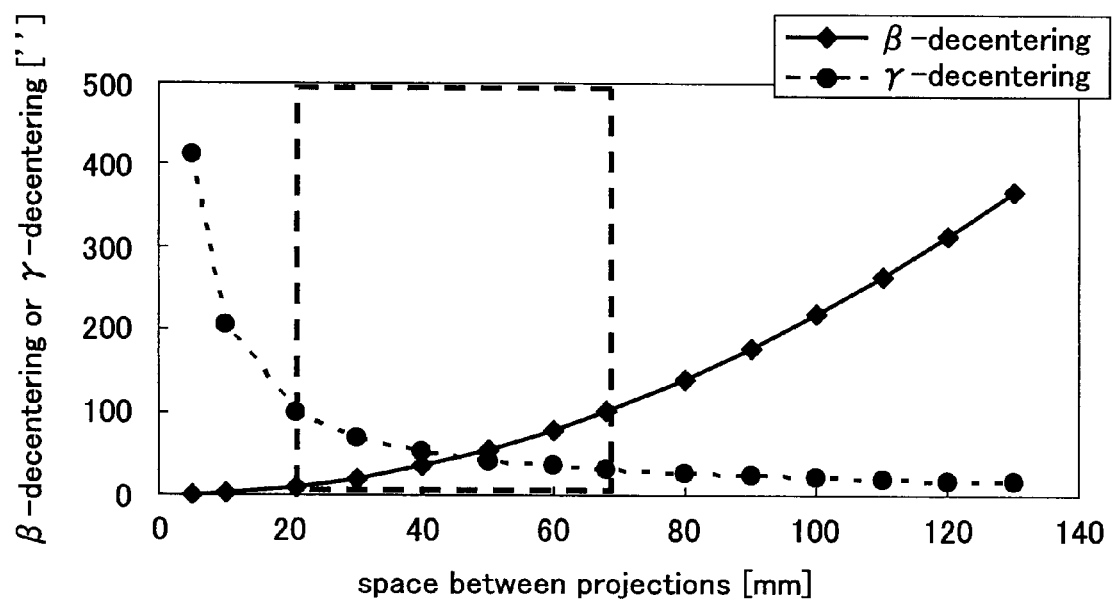

FIGS. 10A and 10B are diagrams showing the first practical example of the optical element according to the first or second embodiment of the present invention. FIG. 10A is a diagram illustrating the configuration of the optical element in the first practical example and FIG. 10B is a diagram showing the characteristics of β-decentering and γ-decentering of the optical element in the first practical example.

As shown in FIG. 10A, an optical element 100 in the first practical example is a planoconvex optical imaging element for an optical scanning device and has an optical surface 101 and three convex portions 103 with identical heights at positions A, B and C on a surface 102 different from the optical surface 101. Among the three convex portions 103, in regard to the two convex portions 103 at positions A and B, the space between the centers of the convex portions is the maximum. Also, in regard to the one convex portion 103 at position C, the length of a perpendicular from the center thereof to a straight line connecting the centers of the two convex portions 103 at positions A and B is the maximum. Additionally, triangle ABC is an isosceles triangle in which the length of side CA equals to the length of side CB.

In FIG. 10A, x is the space between the centers of the two convex portions 103 at positions A and B (convex portion separation). P is the length of a perpendicular from the center of the convex portion 103 at position C to a straight line connecting the centers of the two convex portions 103 at positions A and B, and specifically 21 mm. Also, L is the length of the optical element 100 in the directions of a straight line connecting the centers of the two convex portions 103 at positions A and B, and specifically 150 mm. Furthermore, q is the height of the top surface of the convex portion at position B (or A) with reference to the top surface of the convex portion at position A (or B), which is not shown in the figures, and specifically, 0.01 mm for a usual die casting precision and molding process. Also, $h_0$ is the heights of the ends of the optical element 100 in the directions of a straight line connecting the centers of the two convex portions 103 at positions A and B with reference to a tangential plane of the optical element 100 at the position of a foot of the perpendicular, and specifically 0.05 mm for a usual die casting precision and molding process. In addition, the optical element 100 generally deforms in the form of a quadratic function of x in the directions of a straight line connecting the centers of the two convex portions 103 at positions A and B.

In the optical element 100 shown in FIG. 10A, the three convex portions 103 at positions A, B and C are arranged to satisfy relationships of $\tan^{-1}((x^2/L^2) \times h_0/p) \leq a$ β-decentering specification value and $\tan^{-1}(q/x) \leq a$ γ-decentering specification value. Herein, $\tan^{-1}((x^2/L^2) \times h_0/p)$ is the β-decentering and $\tan^{-1}(q/x)$ is the γ-decentering. Also, the β-decentering specification value and the γ-decentering specification value are assumed to be 100". Then, x satisfying β-decentering≤100" and γ-decentering≤100" is an x provided in a range of $q/\tan(100") \leq x \leq (\tan(100") \times p/h_0 \times L^2)^{1/2}$. That is, x is approximately in a range of 21 mm≤x≤68 mm.

FIG. 10b is a diagram showing relationships of β-decentering and γ-decentering versus the convex portion separation x. In FIG. 10b, the horizontal axis represents the value of the convex portion separation x (mm) and the vertical axis represents the value of β-decentering (") or the value of γ-decentering ("). As shown in FIG. 10b, the smaller the convex portion separation x is, the smaller the β-decentering is. Also, the greater the convex portion separation x is, the smaller the γ-decentering is. Then, the β-decentering and the γ-decentering are approximately equal to or less than 100" in a range of 21 mm≤x≤68 mm.

Furthermore, when P=21 mm and 21 mm≤x≤68 mm, the centers of the convex portions 103 at positions A, B and C are positioned in a first circle which is centered on the geometrical center of gravity G of a surface 102 different from the optical surface 101 of the optical element 100 and has a radius of L/4 (37.5 mm). Also, the centers of the convex portions 103 at positions A, B and C are positioned out of a second circle which is centered on the geometrical center of gravity G of a surface 102 different from the optical surface 101 of the optical element 100 and has a radius of L/10 (15 mm).

Practical Example 2

Figure 11A:
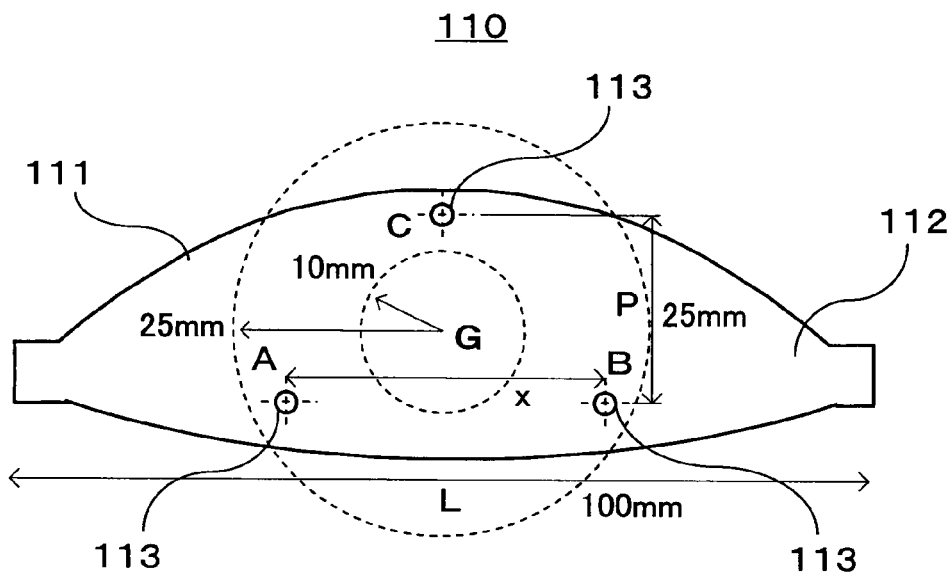
FIGS. 11A and 11B are diagrams showing the second practical example of the optical element according to the first or second embodiment of the present invention.
Figure 11B:
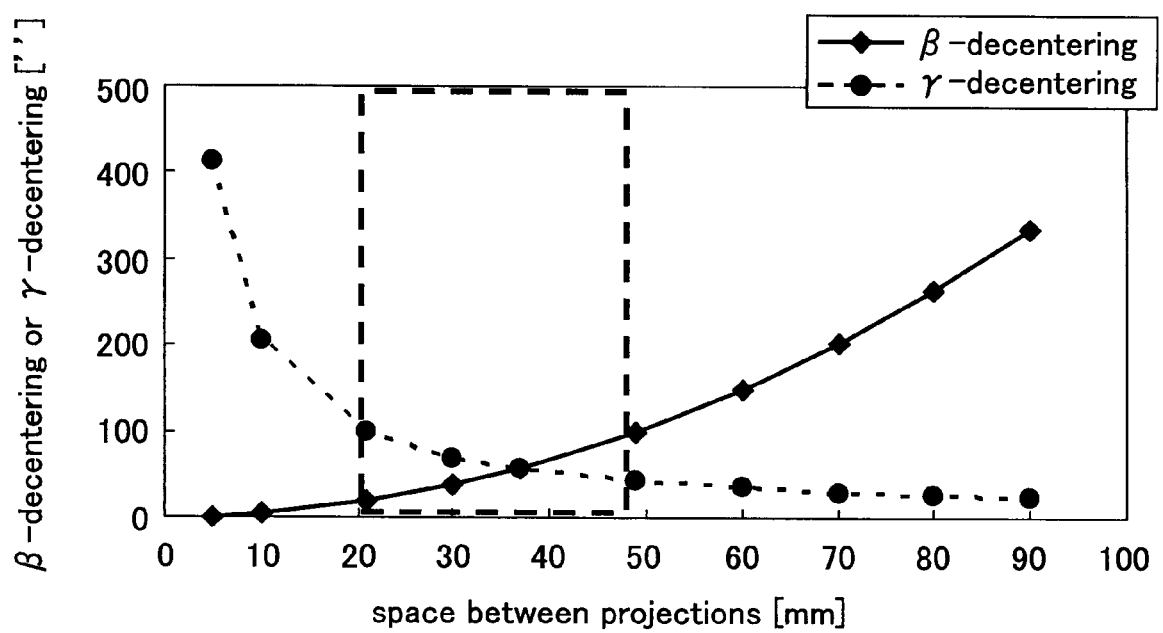

FIGS. 11A and 11B are diagrams showing the second practical example of the optical element according to the first or second embodiment of the present invention. FIG. 11A is a diagram illustrating the configuration of the optical element in the second practical example and FIG. 11B is a diagram showing the characteristics of β-decentering and γ-decentering of the optical element in the second practical example.

As shown in FIG. 11A, an optical element 110 in the second practical example is a biconvex optical imaging element for an optical scanning device and has an optical surface 111 and three convex portions 113 with identical heights at positions A, B and C on a surface 112 different from the optical surface 111. Among the three convex portions 113, in regard to the two convex portions 113 at positions A and B, the space between the centers of the convex portions is the maximum. Also, in regard to the one convex portion 113 at position C, the length of a perpendicular from the center thereof to a straight line connecting the centers of the two convex portions 113 at positions A and B is the maximum. Additionally, triangle ABC is an isosceles triangle in which the length of side CA equals to the length of side CB.

In FIG. 11A, x is the space between the centers of the two convex portions 113 at positions A and B (convex portion separation). P is the length of a perpendicular from the center of the convex portion 113 at position C to a straight line connecting the centers of the two convex portions 113 at positions A and B, and specifically 25 mm. Also, L is the length of the optical element 110 in the directions of a straight line connecting the centers of the two convex portions 113 at positions A and B, and specifically 100 mm. Furthermore, q is the height of the top surface of the convex portion at position B (or A) with reference to the top surface of the convex portion at position A (or B), which is not shown in the figures, and specifically, 0.01 mm for a usual die casting precision and molding process. Also, $h_0$ is the heights of the ends of the optical element 110 in the directions of a straight line connecting the centers of the two convex portions 113 at positions A and B with reference to a tangential plane of the optical element 110 at the position of a foot of the perpendicular, and specifically 0.05 mm for a usual die casting precision and molding process. In addition, the optical element 110 generally deforms in the form of a quadratic function of x in the directions of a straight line connecting the centers of the two convex portions 113 at positions A and B.

In the optical element 110 shown in FIG. 11A, the three convex portions 113 at positions A, B and C are arranged to satisfy relationships of $\tan^{-1}((x^2/L^2) \times h_0/p) \leq a$ β-decentering specification value and $\tan^{-1}(q/x) \leq a$ γ-decentering specification value. Herein, $\tan^{-1}((x^2/L^2) \times h_0/p)$ is the β-decentering and $\tan^{-1}(q/x)$ is the γ-decentering. Also, the β-decentering specification value and the γ-decentering specification value are assumed to be 100". Then, x satisfying β-decentering≤100" and γ-decentering≤100" is an x provided in a range of $q/\tan(100") \leq x \leq (\tan(100") \times p/h_0 \times L^2)^{1/2}$. That is, x is approximately in a range of 21 mm≤x≤49 mm.

FIG. 11b is a diagram showing relationships of β-decentering and γ-decentering versus the convex portion separation x. In FIG. 11b, the horizontal axis represents the value of the convex portion separation x (mm) and the vertical axis represents the value of β-decentering (") or the value of γ-decentering ("). As shown in FIG. 11b, the smaller the convex portion separation x is, the smaller the β-decentering is. Also, the greater the convex portion separation x is, the smaller the γ-decentering is. Then, the β-decentering and the γ-decentering are approximately equal to or less than 100″ in a range of 21 mm≦x≦49 mm.

Furthermore, when P=25 mm and 21 mm≦x≦49 mm, the centers of the convex portions 113 at positions A, B and C are positioned in a first circle which is centered on the geometrical center of gravity G of a surface 112 different from the optical surface 111 of the optical element 110 and has a radius of L/4 (25 mm). Also, the centers of the convex portions 113 at positions A, B and C are positioned out of a second circle which is centered on the geometrical center of gravity G of a surface 112 different from the optical surface 111 of the optical element 110 and has a radius of L/10 (10 mm).

Practical Example 3

Figure 12A:
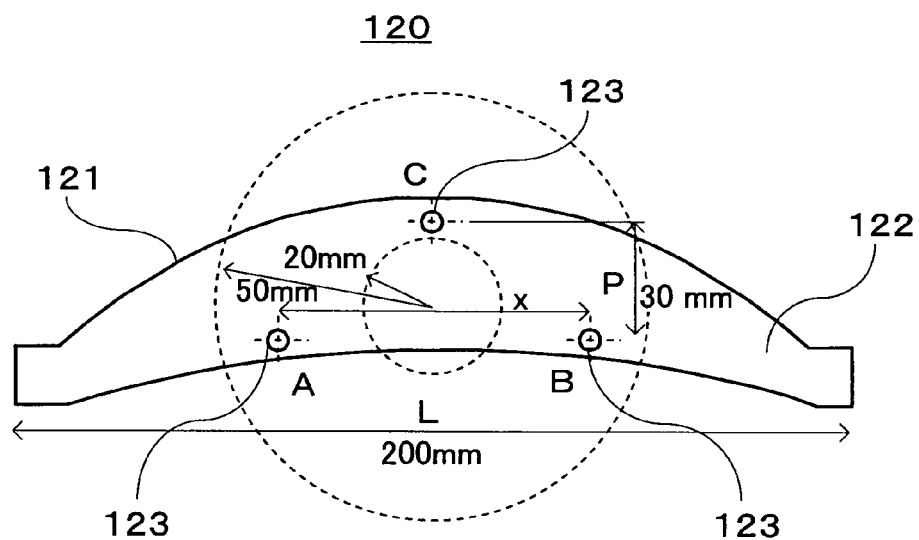
FIGS. 12A and 12B are diagrams showing the third practical example of the optical element according to the first or second embodiment of the present invention.
Figure 12B:
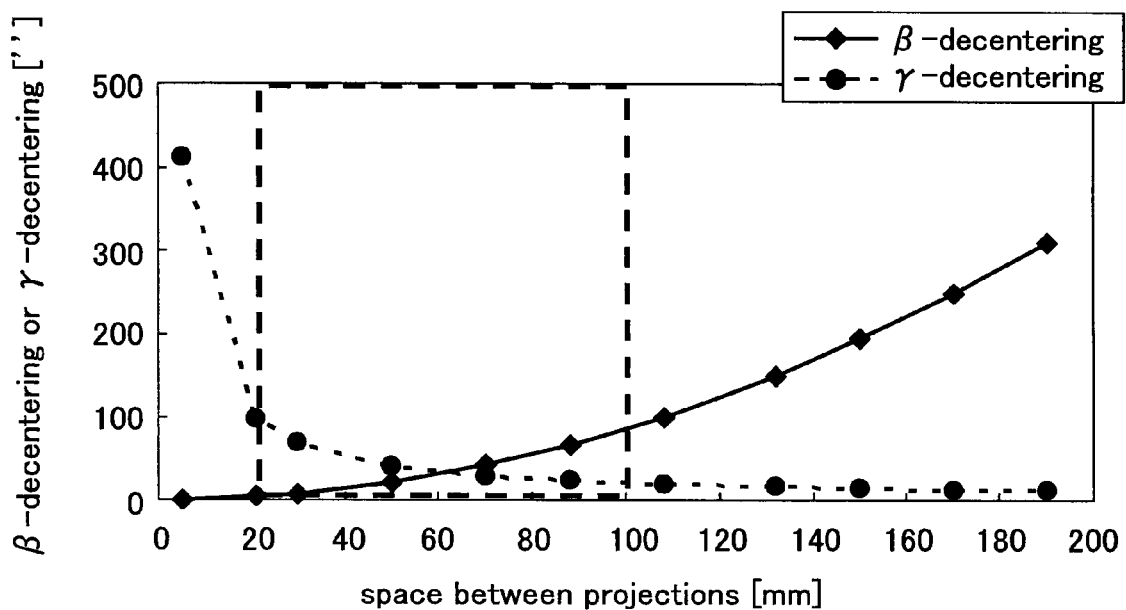

FIGS. 12A and 12B are diagrams showing the third practical example of the optical element according to the first or second embodiment of the present invention. FIG. 12A is a diagram illustrating the configuration of the optical element in the third practical example and FIG. 12B is a diagram showing the characteristics of β-decentering and γ-decentering of the optical element in the third practical example.

As shown in FIG. 12A, an optical element 120 in the third practical example is a meniscus optical imaging element for an optical scanning device and has an optical surface 121 and three convex portions 123 with identical heights at positions A, B and C on a surface 122 different from the optical surface 121. Among the three convex portions 123, in regard to the two convex portions 123 at positions A and B, the space between the centers of the convex portions is the maximum. Also, in regard to the one convex portion 123 at position C, the length of a perpendicular from the center thereof to a straight line connecting the centers of the two convex portions 123 at positions A and B is the maximum. Additionally, triangle ABC is an isosceles triangle in which the length of side CA equals to the length of side CB.

In FIG. 12A, x is the space between the centers of the two convex portions 123 at positions A and B (convex portion separation). P is the length of a perpendicular from the center of the convex portion 123 at position C to a straight line connecting the centers of the two convex portions 123 at positions A and B, and specifically 30 mm. Also, L is the length of the optical element 120 in the directions of a straight line connecting the centers of the two convex portions 123 at positions A and B, and specifically 200 mm. Furthermore, q is the height of the top surface of the convex portion at position B (or A) with reference to the top surface of the convex portion at position A (or B), which is not shown in the figures, and specifically, 0.01 mm for a usual die casting precision and molding process. Also, $h_0$ is the heights of the ends of the optical element 120 in the directions of a straight line connecting the centers of the two convex portions 123 at positions A and B with reference to a tangential plane of the optical element 120 at the position of a foot of the perpendicular, and specifically 0.05 mm for a usual die casting precision and molding process. In addition, the optical element 120 generally deforms in the form of a quadratic function of x in the directions of a straight line connecting the centers of the two convex portions 123 at positions A and B.

In the optical element 120 shown in FIG. 12A, the three convex portions 123 at positions A, B and C are arranged to satisfy relationships of $\tan^{-1}((x^2/L^2) \times h_0/p) \leq$ a β-decentering specification value and $\tan^{-1}(q/x) \leq$ a γ-decentering specification value. Herein, $\tan^{-1}((x^2/L^2) \times h_0/p)$ is the β-decentering and $\tan^{-1}(q/x)$ is the γ-decentering. Also, the β-decentering specification value and the γ-decentering specification value are assumed to be 100″. Then, x satisfying β-decentering≦100″ and γ-decentering≦100″ is an x provided in a range of $q/\tan(100″) \leq x \leq (\tan(100″) \times p/h_0 \times L^2)^{1/2}$. That is, x is approximately in a range of 21 mm≦x≦108 mm.

FIG. 12b is a diagram showing relationships of β-decentering and γ-decentering versus the convex portion separation x. In FIG. 12b, the horizontal axis represents the value of the convex portion separation x (mm) and the vertical axis represents the value of β-decentering (″) or the value of γ-decentering (″). As shown in FIG. 12b, the smaller the convex portion separation x is, the smaller the β-decentering is. Also, the greater the convex portion separation x is, the smaller the γ-decentering is. Then, the β-decentering and the γ-decentering are approximately equal to or less than 100″ in a range of 21 mm≦x≦108 mm.

Furthermore, when P=30 mm and 21 mm≦x≦108 mm, the centers of the convex portions 123 at positions A, B and C are positioned in a first circle which is centered on the geometrical center of gravity G of a surface 122 different from the optical surface 121 of the optical element 120 and has a radius of L/4 (50 mm). Also, the centers of the convex portions 123 at positions A, B and C are positioned out of a second circle which is centered on the geometrical center of gravity G of a surface 122 different from the optical surface 121 of the optical element 120 and has a radius of L/10 (20 mm).

APPENDIX

Typical embodiments (1) to (11) of the present invention are described below.

Embodiment (1)

An optical element having an optical surface and at least three convex portions on a surface different from the optical surface, characterized in that, among the at least three convex portions, two convex portions a space between whose centers is a maximum and one convex portion a length of a perpendicular from whose center to a straight line connecting centers of the two convex portions is a maximum satisfy a relationship of $\tan^{-1}(h/p) \leq$ a first specification value, wherein h is a greater one of heights of the optical element at centers of the two convex portions with reference to a tangential plane of the optical element at a position of a foot of the perpendicular, and p is a length of the perpendicular.

Embodiment (2)

The optical element as described in embodiment (1) above, characterized in that $h = (x^2/L^2) \times h_0$, wherein x is a space between centers of the two convex portions, L is a length of the optical element in directions of a straight line connecting centers of the two convex portions, and $h_0$ is a greater one of heights of ends of the optical element in directions of a straight line connecting centers of the two convex portions with reference to a tangential plane of the optical element at a position of a foot of the perpendicular.

Embodiment (3)

The optical element as described in embodiment (1) or (2) above, characterized in that the two convex portions and the one convex portion satisfy a relationship of $\tan^{-1}(q/x) \leq$ a second specification value, wherein q is a height of a top surface of one convex portion of the two convex portions with reference to a top surface of the other convex portion and x is a space between centers of the two convex portions.

Embodiment (4)

The optical element as described in any of embodiments (1) to (3) above, characterized in that the at least three convex portions are only composed of the two convex portions and the one convex portion.

Embodiment (5)

The optical element as described in any of embodiments (1) to (4) above, characterized in that a foot of the perpendicular is a center of a straight line connecting centers of the two convex portions.

Embodiment (6)

An optical element having an optical surface and at least three convex portions on a surface different from the optical element, characterized in that, among the at least three convex portions, centers of two convex portions a space between whose centers is a maximum and a center of one convex portion a length of a perpendicular from whose center to a straight line connecting centers of the two convex portions is a maximum are positioned in a first circle which is centered on a center of gravity of a surface having the at least three convex portions and has a radius of L/2 or on the first circle, and L is a length of the optical element in directions of a straight line connecting centers of the two convex portions.

Embodiment (7)

The optical element as described in embodiment (6) above, characterized in that centers of the two convex portions and a center of the one convex portion are positioned in a first circle which is centered on a center of gravity of a surface having the at least three convex portions and has a radius of L/4 or on the first circle.

Embodiment (8)

The optical element as described in embodiment (6) or (7) above, characterized in that centers of the two convex portions and a center of the one convex portion are positioned out of a second circle which is centered on a center of gravity of a surface having the at least three convex portions and has a radius of L/10 or on the second circle.

Embodiment (9)

The optical element as described in any of embodiments (1) to (8) above, characterized by being an optical imaging element for imaging light generating from a light source on an object to be scanned with the light via the optical surface.

Embodiment (10)

An optical scanning device for scanning an object by using light generating from a light source which device includes at least one optical element, characterized in that the at least one optical element includes the optical element as described in any of embodiments (1) to (9) above.

Embodiment (11)

An image formation apparatus for forming an image on a photoconductor which apparatus includes an optical scanning device for scanning the photoconductor by using light generating from a light source, characterized in that the optical scanning device includes the optical scanning device as described in embodiment (10) above.

According to at least one of the typical embodiments described above, it becomes possible to provide an optical element capable of improving the precision of arrangement of the optical element.

According to at least one of the typical embodiments described above, it becomes possible to provide an optical scanning device which includes an optical element capable of improving the precision of arrangement of the optical element.

According to at least one of the typical embodiments described above, it becomes possible to provide an image forming apparatus which includes an optical scanning device which includes an optical element capable of improving the precision of arrangement of the optical element.

Although the embodiments and practical examples of the present invention have been specifically described above, the present invention is not limited to the embodiments or practical examples and the embodiments or practical examples may be varied or modified without departing from the spirit and scope of the present invention.

The present application claims the benefit of the foreign priority based on Japanese Patent Application No. 2006-221259 filed on Aug. 14, 2006, the entire contents of which are hereby incorporated by reference.

What is claimed is:

1. An optical element, comprising:
   an optical surface; and
   at least three convex portions on a curved side surface different from the optical surface,
   wherein, among the at least three convex portions,
   first and second convex portions are disposed along a straight line,
   a third convex portion is located at a perpendicular length p from said straight line;
   h is the greater of two separation distances separating the first and second convex portions on the curved side surface from a tangential plane at the third convex portion;
   the greater separation distance h and the perpendicular length p satisfy a relationship of $\tan^{-1}(h/p) \leq$ a first specification value, and
   the first specification value is a 100 arcseconds.

2. The optical element as claimed in claim 1, wherein $h = (x^2/L^2) \times h_0$, where x is a space between the first and second convex portions along said straight line, L is a length of the optical element in a direction of said straight line, and $h_0$ is the greater of two separation distances separating the two ends of the optical element in a direction of said straight line from the tangential plane of the curved side surface at the third convex portion.

3. The optical element as claimed in claim 1, wherein $\tan^{-1}(q/x) \leq$ a second specification value, where q is a difference in heights from the curved surface of a top surface of one convex portion of the first or second convex portions with reference to a top surface of the other of the first or second convex portions, x is a space between the first and second convex portions, and the second specification value is a 100 arcseconds.

4. The optical element as claimed in claim 1, wherein the at least three convex portions include only the first, second, and third convex portions.

5. The optical element as claimed in claim 1, wherein the third convex portion is located equidistantly from the first and second convex portions.

6. The optical element as claimed in claim 1, wherein the optical surface is configured to image light from a light source on an object to be scanned.

7. An optical scanning device for scanning an object by using light generating from a light source which device includes at least one optical element, wherein the at least one optical element includes the optical element as claimed in claim 1.

8. An image formation apparatus for forming an image on a photoconductor which apparatus includes an optical scanning device for scanning the photoconductor by using light generating from a light source, wherein the optical scanning device includes the optical scanning device as claimed in claim 7.

9. The optical element according to claim 1, wherein a separation distance between the first and second convex portions is equal to or greater than a distance between any two other convex portions of said at least three convex portions.

10. The optical element according to claim 1, wherein the perpendicular length p from the third convex portion to said straight line is equal to or greater than a perpendicular length from any other convex portion among said at least three convex portions.

11. An optical element, comprising:

an optical surface; and at least three protrusions on a curved side surface different from the optical surface, wherein, among the at least three protrusions, first and second protrusions are disposed along a straight line, a third protrusion is located between the first and second protrusions at a perpendicular length p from said straight line;

h is the greater of two separation distances, a first separating distance and a second separating distance, the first separating distance being the distance between the first protrusion and a tangential plane which touches the curved side surface at a single point along the perpendicular length p, and the second separating distance being the distance between the second protrusion and the tangential plane;

the separation distance h and the perpendicular length p satisfy a relationship of $\tan^{-1}(h/p) \leq$ a first specification value, and the first specification value is a 100 arcseconds.

* * * * *